(12) United States Patent
Katragadda et al.

(10) Patent No.: US 8,108,656 B2
(45) Date of Patent: Jan. 31, 2012

(54) TASK DEFINITION FOR SPECIFYING RESOURCE REQUIREMENTS

(75) Inventors: Ramana Katragadda, Carlsbad, CA (US); Paul Spoltore, Fremont, CA (US); Ric Howard, San Jose, CA (US)

(73) Assignee: QST Holdings, LLC, Palo Alto, CA (US)

( * ) Notice: Subject to any disclaimer, the term of this patent is extended or adjusted under 35 U.S.C. 154(b) by 707 days.

(21) Appl. No.: 10/233,175

(22) Filed: Aug. 29, 2002

(65) Prior Publication Data

US 2004/0054997 A1    Mar. 18, 2004

(51) Int. Cl.
*G06F 9/30* (2006.01)
*G06F 9/46* (2006.01)
*G06F 15/76* (2006.01)
*G06F 15/16* (2006.01)

(52) U.S. Cl. ........ 712/215; 718/102; 718/103; 718/104; 712/37; 709/205

(58) Field of Classification Search .................. 709/205, 709/226, 201; 718/105, 100, 102–104; 712/28, 712/37
See application file for complete search history.

(56) References Cited

U.S. PATENT DOCUMENTS

| | | | |
|---|---|---|---|
| 3,409,175 A | 11/1968 | Byrne | |
| 3,666,143 A | 5/1972 | Weston | |
| 3,938,639 A | 2/1976 | Birrell | |
| 3,949,903 A | 4/1976 | Benasutti et al. | |
| 3,960,298 A | 6/1976 | Birrell | |
| 3,967,062 A | 6/1976 | Dobias | |
| 3,991,911 A | 11/1976 | Shannon et al. | |
| 3,995,441 A | 12/1976 | McMillin | |
| 4,076,145 A | 2/1978 | Zygiel | |
| 4,143,793 A | 3/1979 | McMillin et al. | |
| 4,172,669 A | 10/1979 | Edelbach | |
| 4,174,872 A | 11/1979 | Fessler | |
| 4,181,242 A | 1/1980 | Zygiel et al. | |
| RE30,301 E | 6/1980 | Zygiel | |
| 4,218,014 A | 8/1980 | Tracy | |

(Continued)

FOREIGN PATENT DOCUMENTS

DE    100 18 374 A1    10/2001

(Continued)

OTHER PUBLICATIONS

Adl-Tabatabai et al., "Code Reuse in an Optimizing Compiler," OOPSLA, ACM pp. 51-68 (1996).

(Continued)

*Primary Examiner* — Philip Chea
(74) *Attorney, Agent, or Firm* — Nixon Peabody LLP

(57) ABSTRACT

Task definitions are used by a task scheduler and prioritizer to allocate task operation to a plurality of processing units. The task definition is an electronic record that specifies researching needed by, and other characteristics of, a task to be executed. Resources include types of processing nodes desired to execute the task, needed amount or rate of processing cycles, amount of memory capacity, number of registers, input/output ports, buffer sizes, etc. Characteristics of a task include maximum latency tome, frequency of execution of a task, communication ports, and other characteristics. An exemplary task definition language and syntax is described that uses constructs including other of attempted scheduling operations, percentage or amount of resources desired by different operations, handling of multiple executable images or modules, overlays, port aliases and other features.

44 Claims, 3 Drawing Sheets

U.S. PATENT DOCUMENTS

| | | |
|---|---|---|
| 4,222,972 A | 9/1980 | Caldwell |
| 4,237,536 A | 12/1980 | Enelow et al. |
| 4,252,253 A | 2/1981 | Shannon |
| 4,302,775 A | 11/1981 | Widergren et al. |
| 4,333,587 A | 6/1982 | Fessler et al. |
| 4,354,613 A | 10/1982 | Desai et al. |
| 4,377,246 A | 3/1983 | McMillin et al. |
| 4,380,046 A | 4/1983 | Fung |
| 4,393,468 A | 7/1983 | New |
| 4,413,752 A | 11/1983 | McMillin et al. |
| 4,458,584 A | 7/1984 | Annese et al. |
| 4,466,342 A | 8/1984 | Basile et al. |
| 4,475,448 A | 10/1984 | Shoaf et al. |
| 4,509,690 A | 4/1985 | Austin et al. |
| 4,520,950 A | 6/1985 | Jeans |
| 4,549,675 A | 10/1985 | Austin |
| 4,553,573 A | 11/1985 | McGarrah |
| 4,560,089 A | 12/1985 | McMillin et al. |
| 4,577,782 A | 3/1986 | Fessler |
| 4,578,799 A | 3/1986 | Scholl et al. |
| RE32,179 E | 6/1986 | Sedam et al. |
| 4,633,386 A | 12/1986 | Terepin et al. |
| 4,649,512 A | 3/1987 | Nukiyama |
| 4,658,988 A | 4/1987 | Hassell |
| 4,694,416 A | 9/1987 | Wheeler et al. |
| 4,711,374 A | 12/1987 | Gaunt et al. |
| 4,713,755 A | 12/1987 | Worley, Jr. et al. |
| 4,719,056 A | 1/1988 | Scott |
| 4,726,494 A | 2/1988 | Scott |
| 4,747,516 A | 5/1988 | Baker |
| 4,748,585 A | 5/1988 | Chiarulli et al. |
| 4,758,985 A | 7/1988 | Carter |
| 4,760,525 A | 7/1988 | Webb |
| 4,760,544 A | 7/1988 | Lamb |
| 4,765,513 A | 8/1988 | McMillin et al. |
| 4,766,548 A | 8/1988 | Cedrone et al. |
| 4,781,309 A | 11/1988 | Vogel |
| 4,800,492 A | 1/1989 | Johnson et al. |
| 4,811,214 A | 3/1989 | Nosenchuck et al. |
| 4,824,075 A | 4/1989 | Holzboog |
| 4,827,426 A | 5/1989 | Patton et al. |
| 4,850,269 A | 7/1989 | Hancock et al. |
| 4,856,684 A | 8/1989 | Gerstung |
| 4,870,302 A | 9/1989 | Freeman |
| 4,901,887 A | 2/1990 | Burton |
| 4,905,231 A | 2/1990 | Leung et al. |
| 4,921,315 A | 5/1990 | Metcalfe et al. |
| 4,930,666 A | 6/1990 | Rudick |
| 4,932,564 A | 6/1990 | Austin et al. |
| 4,936,488 A | 6/1990 | Austin |
| 4,937,019 A | 6/1990 | Scott |
| 4,960,261 A | 10/1990 | Scott et al. |
| 4,961,533 A | 10/1990 | Teller et al. |
| 4,967,340 A | 10/1990 | Dawes |
| 4,974,643 A | 12/1990 | Bennett et al. |
| 4,982,876 A | 1/1991 | Scott |
| 4,993,604 A | 2/1991 | Gaunt et al. |
| 5,007,560 A | 4/1991 | Sassak |
| 5,021,947 A | 6/1991 | Campbell et al. |
| 5,040,106 A | 8/1991 | Maag |
| 5,044,171 A | 9/1991 | Farkas |
| 5,090,015 A | 2/1992 | Dabbish et al. |
| 5,099,418 A | 3/1992 | Pian et al. |
| 5,129,549 A | 7/1992 | Austin |
| 5,139,708 A | 8/1992 | Scott |
| 5,144,166 A | 9/1992 | Camarota et al. |
| 5,156,301 A | 10/1992 | Hassell et al. |
| 5,156,871 A | 10/1992 | Goulet et al. |
| 5,165,023 A | 11/1992 | Gifford |
| 5,165,575 A | 11/1992 | Scott |
| 5,190,083 A | 3/1993 | Gupta et al. |
| 5,190,189 A | 3/1993 | Zimmer et al. |
| 5,193,151 A | 3/1993 | Jain |
| 5,193,718 A | 3/1993 | Hassell et al. |
| 5,202,993 A | 4/1993 | Tarsy et al. |
| 5,203,474 A | 4/1993 | Haynes |
| 5,218,240 A | 6/1993 | Camarota et al. |
| 5,240,144 A | 8/1993 | Feldman |
| 5,245,227 A | 9/1993 | Furtek et al. |
| 5,261,099 A | 11/1993 | Bigo et al. |
| 5,263,509 A | 11/1993 | Cherry et al. |
| 5,269,442 A | 12/1993 | Vogel |
| 5,280,711 A | 1/1994 | Motta et al. |
| 5,297,400 A | 3/1994 | Benton et al. |
| 5,301,100 A | 4/1994 | Wagner |
| 5,303,846 A | 4/1994 | Shannon |
| 5,325,525 A | 6/1994 | Shan et al. |
| 5,335,276 A | 8/1994 | Thompson et al. |
| 5,336,950 A | 8/1994 | Popli et al. |
| 5,339,428 A | 8/1994 | Burmeister et al. |
| 5,343,716 A | 9/1994 | Swanson et al. |
| 5,361,362 A | 11/1994 | Benkeser et al. |
| 5,367,651 A | 11/1994 | Smith et al. |
| 5,367,687 A | 11/1994 | Tarsy et al. |
| 5,368,198 A | 11/1994 | Goulet |
| 5,379,343 A | 1/1995 | Grube et al. |
| 5,381,546 A * | 1/1995 | Servi et al. .................. 718/102 |
| 5,381,550 A | 1/1995 | Jourdenais et al. |
| 5,388,062 A | 2/1995 | Knutson |
| 5,388,212 A | 2/1995 | Grube et al. |
| 5,392,960 A | 2/1995 | Kendt et al. |
| 5,428,754 A | 6/1995 | Baldwin |
| 5,437,395 A | 8/1995 | Bull et al. |
| 5,450,557 A | 9/1995 | Kopp et al. |
| 5,454,406 A | 10/1995 | Rejret et al. |
| 5,465,368 A | 11/1995 | Davidson et al. |
| 5,475,856 A | 12/1995 | Kogge |
| 5,479,055 A | 12/1995 | Eccles |
| 5,490,165 A | 2/1996 | Blakeney, II et al. |
| 5,491,823 A | 2/1996 | Ruttenberg |
| 5,504,891 A | 4/1996 | Motoyama et al. |
| 5,507,009 A | 4/1996 | Grube et al. |
| 5,515,519 A | 5/1996 | Yoshioka et al. |
| 5,517,600 A | 5/1996 | Shimokawa |
| 5,519,694 A | 5/1996 | Brewer et al. |
| 5,522,070 A * | 5/1996 | Sumimoto .................. 718/104 |
| 5,530,964 A | 6/1996 | Alpert et al. |
| 5,534,796 A | 7/1996 | Edwards |
| 5,542,265 A | 8/1996 | Rutland |
| 5,553,755 A | 9/1996 | Bonewald et al. |
| 5,555,417 A | 9/1996 | Odnert et al. |
| 5,560,028 A | 9/1996 | Sachs et al. |
| 5,560,038 A | 9/1996 | Haddock |
| 5,570,587 A | 11/1996 | Kim |
| 5,572,572 A | 11/1996 | Kawan et al. |
| 5,590,353 A | 12/1996 | Sakakibara et al. |
| 5,594,657 A | 1/1997 | Cantone et al. |
| 5,600,810 A | 2/1997 | Ohkami |
| 5,600,844 A | 2/1997 | Shaw et al. |
| 5,602,833 A | 2/1997 | Zehavi |
| 5,603,043 A | 2/1997 | Taylor et al. |
| 5,607,083 A | 3/1997 | Vogel et al. |
| 5,608,643 A | 3/1997 | Wichter et al. |
| 5,611,867 A | 3/1997 | Cooper et al. |
| 5,619,695 A | 4/1997 | Arbabi et al. |
| 5,623,545 A | 4/1997 | Childs et al. |
| 5,625,669 A | 4/1997 | McGregor et al. |
| 5,626,407 A | 5/1997 | Westcott |
| 5,630,206 A | 5/1997 | Urban et al. |
| 5,635,940 A | 6/1997 | Hickman et al. |
| 5,646,544 A | 7/1997 | Iadanza |
| 5,646,545 A | 7/1997 | Trimberger et al. |
| 5,647,512 A | 7/1997 | Assis Mascarenhas de Oliveira et al. |
| 5,667,110 A | 9/1997 | McCann et al. |
| 5,684,793 A | 11/1997 | Kiema et al. |
| 5,684,980 A | 11/1997 | Casselman |
| 5,687,236 A | 11/1997 | Moskowitz et al. |
| 5,694,613 A | 12/1997 | Suzuki |
| 5,694,794 A | 12/1997 | Jerg et al. |
| 5,699,328 A | 12/1997 | Ishizaki et al. |
| 5,701,398 A | 12/1997 | Glier et al. |
| 5,701,482 A | 12/1997 | Harrison et al. |
| 5,704,053 A | 12/1997 | Santhanam |
| 5,706,191 A | 1/1998 | Bassett et al. |
| 5,706,976 A | 1/1998 | Purkey |
| 5,712,996 A | 1/1998 | Schepers |

| | | | | | | |
|---|---|---|---|---|---|---|
| 5,720,002 A | 2/1998 | Wang | | 5,966,534 A | 10/1999 | Cooke et al. |
| 5,721,693 A | 2/1998 | Song | | 5,970,254 A | 10/1999 | Cooke et al. |
| 5,721,854 A | 2/1998 | Ebcioglu et al. | | 5,987,105 A | 11/1999 | Jenkins et al. |
| 5,729,754 A | 3/1998 | Estes | | 5,987,611 A | 11/1999 | Freund |
| 5,732,563 A | 3/1998 | Bethuy et al. | | 5,991,302 A | 11/1999 | Berl et al. |
| 5,734,808 A | 3/1998 | Takeda | | 5,991,308 A | 11/1999 | Fuhrmann et al. |
| 5,737,631 A | 4/1998 | Trimberger | | 5,993,739 A | 11/1999 | Lyon |
| 5,742,180 A | 4/1998 | DeHon et al. | | 5,999,734 A | 12/1999 | Willis et al. |
| 5,742,821 A | 4/1998 | Prasanna | | 6,005,943 A | 12/1999 | Cohen et al. |
| 5,745,366 A | 4/1998 | Highma et al. | | 6,006,249 A * | 12/1999 | Leong ............................ 718/107 |
| RE35,780 E | 5/1998 | Hassell et al. | | 6,016,395 A | 1/2000 | Mohamed |
| 5,751,295 A | 5/1998 | Becklund et al. | | 6,018,783 A | 1/2000 | Chiang |
| 5,754,227 A | 5/1998 | Fukuoka | | 6,021,186 A | 2/2000 | Suzuki et al. |
| 5,758,261 A | 5/1998 | Wiedeman | | 6,021,492 A | 2/2000 | May |
| 5,768,561 A | 6/1998 | Wise | | 6,023,742 A | 2/2000 | Ebeling et al. |
| 5,771,362 A | 6/1998 | Bartkowiak et al. | | 6,023,755 A | 2/2000 | Casselman |
| 5,778,439 A | 7/1998 | Trimberger et al. | | 6,028,610 A | 2/2000 | Deering |
| 5,784,636 A | 7/1998 | Rupp | | 6,036,166 A | 3/2000 | Olson |
| 5,784,699 A | 7/1998 | McMahon et al. | | 6,039,219 A | 3/2000 | Bach et al. |
| 5,787,237 A | 7/1998 | Reilly | | 6,041,322 A | 3/2000 | Meng et al. |
| 5,790,817 A | 8/1998 | Asghar et al. | | 6,041,970 A | 3/2000 | Vogel |
| 5,791,517 A | 8/1998 | Avital | | 6,046,603 A | 4/2000 | New |
| 5,791,523 A | 8/1998 | Oh | | 6,047,115 A | 4/2000 | Mohan et al. |
| 5,794,062 A | 8/1998 | Baxter | | 6,052,600 A | 4/2000 | Fette et al. |
| 5,794,067 A | 8/1998 | Kadowaki | | 6,055,314 A | 4/2000 | Spies et al. |
| 5,802,055 A | 9/1998 | Krein et al. | | 6,056,194 A | 5/2000 | Kolls |
| 5,802,278 A | 9/1998 | Isfeld et al. | | 6,059,840 A | 5/2000 | Click, Jr. |
| 5,812,851 A | 9/1998 | Levy et al. | | 6,061,580 A | 5/2000 | Altschul et al. |
| 5,818,603 A | 10/1998 | Motoyama | | 6,073,132 A | 6/2000 | Gehman |
| 5,819,255 A | 10/1998 | Celis et al. | | 6,076,174 A * | 6/2000 | Freund ............................ 714/47 |
| 5,822,308 A | 10/1998 | Weigand et al. | | 6,078,736 A | 6/2000 | Guccione |
| 5,822,313 A | 10/1998 | Malek et al. | | 6,085,740 A | 7/2000 | Ivri et al. |
| 5,822,360 A | 10/1998 | Lee et al. | | 6,088,043 A | 7/2000 | Kelleher et al. |
| 5,828,858 A | 10/1998 | Athanas et al. | | 6,091,263 A | 7/2000 | New et al. |
| 5,829,085 A | 11/1998 | Jerg et al. | | 6,091,765 A | 7/2000 | Pietzold, III et al. |
| 5,835,753 A | 11/1998 | Witt | | 6,092,095 A * | 7/2000 | Maytal ............................ 718/100 |
| 5,838,165 A | 11/1998 | Chatter | | 6,094,065 A | 7/2000 | Tavana et al. |
| 5,838,894 A | 11/1998 | Horst | | 6,094,726 A | 7/2000 | Gonion et al. |
| 5,845,815 A | 12/1998 | Vogel | | 6,111,893 A | 8/2000 | Volftsun et al. |
| 5,854,929 A | 12/1998 | Van Pract et al. | | 6,111,935 A | 8/2000 | Hughes-Hartogs |
| 5,860,021 A | 1/1999 | Klingman | | 6,115,751 A | 9/2000 | Tam et al. |
| 5,862,961 A | 1/1999 | Motta et al. | | 6,119,178 A | 9/2000 | Martin et al. |
| 5,870,427 A | 2/1999 | Teidemann, Jr. et al. | | 6,120,551 A | 9/2000 | Law et al. |
| 5,873,045 A | 2/1999 | Lee et al. | | 6,122,670 A | 9/2000 | Bennett et al. |
| 5,881,106 A | 3/1999 | Cartier | | 6,128,307 A | 10/2000 | Brown |
| 5,884,284 A | 3/1999 | Peters et al. | | 6,134,605 A | 10/2000 | Hudson et al. |
| 5,886,537 A | 3/1999 | Macias et al. | | 6,134,629 A | 10/2000 | L'Ecuyer |
| 5,887,174 A | 3/1999 | Simons et al. | | 6,138,693 A | 10/2000 | Matz |
| 5,889,816 A | 3/1999 | Agrawal et al. | | 6,141,283 A | 10/2000 | Bogin et al. |
| 5,889,989 A | 3/1999 | Robertazzi et al. | | 6,150,838 A | 11/2000 | Wittig et al. |
| 5,890,014 A | 3/1999 | Long | | 6,154,492 A | 11/2000 | Araki et al. |
| 5,892,900 A | 4/1999 | Ginter et al. | | 6,154,494 A | 11/2000 | Sugahara et al. |
| 5,892,950 A | 4/1999 | Rigori et al. | | 6,157,997 A | 12/2000 | Oowaki et al. |
| 5,892,961 A | 4/1999 | Trimberger | | 6,158,031 A | 12/2000 | Mack et al. |
| 5,892,962 A | 4/1999 | Cloutier | | 6,173,389 B1 | 1/2001 | Pechanek et al. |
| 5,894,473 A | 4/1999 | Dent | | 6,175,854 B1 | 1/2001 | Bretscher |
| 5,901,884 A | 5/1999 | Goulet et al. | | 6,175,892 B1 | 1/2001 | Sazzad et al. |
| 5,903,886 A | 5/1999 | Heimlich et al. | | 6,181,981 B1 | 1/2001 | Varga et al. |
| 5,907,285 A | 5/1999 | Toms et al. | | 6,185,418 B1 | 2/2001 | MacLellan et al. |
| 5,907,580 A | 5/1999 | Cummings | | 6,192,070 B1 | 2/2001 | Poon et al. |
| 5,910,733 A | 6/1999 | Bertolet et al. | | 6,192,255 B1 | 2/2001 | Lewis et al. |
| 5,912,572 A | 6/1999 | Graf, III | | 6,192,388 B1 * | 2/2001 | Cajolet ............................ 718/100 |
| 5,913,172 A | 6/1999 | McCabe et al. | | 6,195,788 B1 | 2/2001 | Leaver et al. |
| 5,917,852 A | 6/1999 | Butterfield et al. | | 6,198,924 B1 | 3/2001 | Ishii et al. |
| 5,920,801 A | 7/1999 | Thomas et al. | | 6,199,181 B1 | 3/2001 | Rechef et al. |
| 5,931,918 A | 8/1999 | Row et al. | | 6,202,130 B1 | 3/2001 | Scales, III et al. |
| 5,933,642 A | 8/1999 | Greenbaum et al. | | 6,202,189 B1 | 3/2001 | Hinedi et al. |
| 5,940,438 A | 8/1999 | Poon et al. | | 6,219,697 B1 | 4/2001 | Lawande et al. |
| 5,940,612 A * | 8/1999 | Brady et al. .................. 718/103 | | 6,219,756 B1 | 4/2001 | Kasamizugami |
| 5,949,415 A | 9/1999 | Lin et al. | | 6,219,780 B1 | 4/2001 | Lipasti |
| 5,950,011 A | 9/1999 | Albrecht et al. | | 6,223,222 B1 | 4/2001 | Fijolek et al. |
| 5,950,131 A | 9/1999 | Vilmur | | 6,226,387 B1 | 5/2001 | Tewfik et al. |
| 5,951,674 A | 9/1999 | Moreno | | 6,230,307 B1 | 5/2001 | Davis et al. |
| 5,953,322 A | 9/1999 | Kimball | | 6,237,029 B1 | 5/2001 | Master et al. |
| 5,956,518 A | 9/1999 | DeHon et al. | | 6,246,883 B1 | 6/2001 | Lee |
| 5,956,967 A | 9/1999 | Kim | | 6,247,125 B1 | 6/2001 | Noel-Baron et al. |
| 5,959,811 A | 9/1999 | Richardson | | 6,249,251 B1 | 6/2001 | Chang et al. |
| 5,959,881 A | 9/1999 | Trimberger et al. | | 6,258,725 B1 | 7/2001 | Lee et al. |
| 5,963,048 A * | 10/1999 | Harrison et al. ................ 326/39 | | 6,263,057 B1 | 7/2001 | Silverman |

| Patent No. | Date | Inventor(s) |
|---|---|---|
| 6,266,760 B1 | 7/2001 | DeHon et al. |
| 6,272,579 B1 | 8/2001 | Lentz et al. |
| 6,272,616 B1 | 8/2001 | Fernando et al. |
| 6,281,703 B1 | 8/2001 | Furuta et al. |
| 6,282,627 B1 | 8/2001 | Wong et al. |
| 6,286,134 B1 | 9/2001 | Click, Jr. et al. |
| 6,289,375 B1 | 9/2001 | Knight et al. |
| 6,289,434 B1 | 9/2001 | Roy |
| 6,289,488 B1 | 9/2001 | Dave et al. |
| 6,292,822 B1 | 9/2001 | Hardwick |
| 6,292,827 B1 | 9/2001 | Raz |
| 6,292,830 B1 | 9/2001 | Taylor et al. |
| 6,292,938 B1 | 9/2001 | Sarkar et al. |
| 6,301,653 B1 | 10/2001 | Mohamed et al. |
| 6,304,953 B1 * | 10/2001 | Henstrom et al. ............ 712/215 |
| 6,305,014 B1 | 10/2001 | Roediger et al. |
| 6,311,149 B1 | 10/2001 | Ryan et al. |
| 6,321,985 B1 | 11/2001 | Kolls |
| 6,326,806 B1 | 12/2001 | Fallside et al. |
| 6,346,824 B1 | 2/2002 | New |
| 6,347,346 B1 | 2/2002 | Taylor |
| 6,349,394 B1 | 2/2002 | Brock et al. |
| 6,353,841 B1 | 3/2002 | Marshall et al. |
| 6,356,994 B1 | 3/2002 | Barry et al. |
| 6,359,248 B1 | 3/2002 | Mardi |
| 6,360,256 B1 | 3/2002 | Lim |
| 6,360,259 B1 | 3/2002 | Bradley |
| 6,360,263 B1 * | 3/2002 | Kurtzberg et al. ............ 709/226 |
| 6,363,411 B1 | 3/2002 | Dugan et al. |
| 6,366,999 B1 | 4/2002 | Drabenstott et al. |
| 6,377,983 B1 | 4/2002 | Cohen et al. |
| 6,378,072 B1 | 4/2002 | Collins et al. |
| 6,381,293 B1 | 4/2002 | Lee et al. |
| 6,381,735 B1 | 4/2002 | Hunt |
| 6,385,751 B1 | 5/2002 | Wolf |
| 6,405,214 B1 | 6/2002 | Meade, II |
| 6,408,039 B1 | 6/2002 | Ito |
| 6,410,941 B1 | 6/2002 | Taylor et al. |
| 6,411,612 B1 | 6/2002 | Halford et al. |
| 6,421,372 B1 | 7/2002 | Bierly et al. |
| 6,421,809 B1 | 7/2002 | Wuytack et al. |
| 6,426,649 B1 | 7/2002 | Fu et al. |
| 6,430,624 B1 | 8/2002 | Jamtgaard et al. |
| 6,433,578 B1 | 8/2002 | Wasson |
| 6,434,590 B1 * | 8/2002 | Blelloch et al. ............... 718/102 |
| 6,438,573 B1 * | 8/2002 | Nilsen .......................... 718/100 |
| 6,438,737 B1 | 8/2002 | Morelli et al. |
| 6,446,258 B1 | 9/2002 | McKinsey et al. |
| 6,449,747 B2 | 9/2002 | Wuytack et al. |
| 6,456,996 B1 | 9/2002 | Crawford, Jr. et al. |
| 6,459,883 B2 | 10/2002 | Subramanian et al. |
| 6,467,009 B1 | 10/2002 | Winegarden et al. |
| 6,469,540 B2 | 10/2002 | Nakaya |
| 6,473,609 B1 | 10/2002 | Schwartz et al. |
| 6,483,343 B1 | 11/2002 | Faith et al. |
| 6,507,947 B1 | 1/2003 | Schreiber et al. |
| 6,510,138 B1 | 1/2003 | Pannell |
| 6,510,510 B1 | 1/2003 | Garde |
| 6,526,570 B1 | 2/2003 | Click, Jr. et al. |
| 6,538,470 B1 | 3/2003 | Langhammer et al. |
| 6,556,044 B2 | 4/2003 | Langhammer et al. |
| 6,563,891 B1 | 5/2003 | Eriksson et al. |
| 6,570,877 B1 | 5/2003 | Kloth et al. |
| 6,577,678 B2 | 6/2003 | Scheuermann |
| 6,587,684 B1 | 7/2003 | Hsu et al. |
| 6,590,415 B2 | 7/2003 | Agrawal et al. |
| 6,601,086 B1 | 7/2003 | Howard et al. |
| 6,601,158 B1 | 7/2003 | Abbott et al. |
| 6,604,085 B1 | 8/2003 | Kolls |
| 6,604,189 B1 | 8/2003 | Zemlyak et al. |
| 6,606,529 B1 | 8/2003 | Crowder, Jr. et al. |
| 6,611,906 B1 | 8/2003 | McAllister et al. |
| 6,615,333 B1 | 9/2003 | Hoogerbrugge et al. |
| 6,618,434 B2 | 9/2003 | Heidari-Bateni et al. |
| 6,618,777 B1 | 9/2003 | Greenfield |
| 6,640,304 B2 | 10/2003 | Ginter et al. |
| 6,647,429 B1 | 11/2003 | Semal |
| 6,653,859 B2 | 11/2003 | Sihlbom et al. |
| 6,675,265 B2 | 1/2004 | Barroso et al. |
| 6,675,284 B1 | 1/2004 | Warren |
| 6,684,319 B1 | 1/2004 | Mohamed et al. |
| 6,691,148 B1 | 2/2004 | Zinky et al. |
| 6,694,380 B1 | 2/2004 | Wolrich et al. |
| 6,711,617 B1 | 3/2004 | Bantz et al. |
| 6,718,182 B1 | 4/2004 | Kung |
| 6,718,541 B2 | 4/2004 | Ostanevich et al. |
| 6,721,286 B1 | 4/2004 | Williams et al. |
| 6,721,884 B1 | 4/2004 | De Oliveira Kastrup Pereira et al. |
| 6,732,354 B2 | 5/2004 | Ebeling et al. |
| 6,735,621 B1 | 5/2004 | Yoakum et al. |
| 6,738,744 B2 | 5/2004 | Kirovski et al. |
| 6,748,360 B2 | 6/2004 | Pitman et al. |
| 6,751,723 B1 | 6/2004 | Kundu et al. |
| 6,754,470 B2 | 6/2004 | Hendrickson et al. |
| 6,760,587 B2 | 7/2004 | Holtzman et al. |
| 6,760,833 B1 | 7/2004 | Dowling |
| 6,766,165 B2 | 7/2004 | Sharma et al. |
| 6,778,212 B1 | 8/2004 | Deng et al. |
| 6,785,341 B2 | 8/2004 | Walton et al. |
| 6,807,590 B1 | 10/2004 | Carlson et al. |
| 6,819,140 B2 | 11/2004 | Yamanaka et al. |
| 6,823,448 B2 | 11/2004 | Roth et al. |
| 6,829,633 B2 | 12/2004 | Gelfer et al. |
| 6,832,250 B1 | 12/2004 | Coons et al. |
| 6,836,839 B2 | 12/2004 | Master et al. |
| 6,859,434 B2 | 2/2005 | Segal et al. |
| 6,865,664 B2 | 3/2005 | Budrovic et al. |
| 6,871,236 B2 | 3/2005 | Fishman et al. |
| 6,883,074 B2 | 4/2005 | Lee et al. |
| 6,883,084 B1 | 4/2005 | Donohoe |
| 6,894,996 B2 | 5/2005 | Lee |
| 6,901,440 B1 | 5/2005 | Bimm et al. |
| 6,907,598 B2 | 6/2005 | Fraser |
| 6,912,515 B2 | 6/2005 | Jackson et al. |
| 6,941,336 B1 | 9/2005 | Mar |
| 6,980,515 B1 | 12/2005 | Schunk et al. |
| 6,985,517 B2 | 1/2006 | Matsumoto et al. |
| 6,986,021 B2 | 1/2006 | Master et al. |
| 6,986,142 B1 | 1/2006 | Ehlig et al. |
| 6,988,139 B1 * | 1/2006 | Jervis et al. ................... 709/226 |
| 7,032,229 B1 | 4/2006 | Flores et al. |
| 7,044,741 B2 | 5/2006 | Leem |
| 7,082,456 B2 | 7/2006 | Mani-Meitav et al. |
| 7,139,910 B1 | 11/2006 | Ainsworth et al. |
| 7,142,731 B1 | 11/2006 | Toi |
| 7,249,242 B2 | 7/2007 | Ramchandran |
| 2001/0003191 A1 | 6/2001 | Kovacs et al. |
| 2001/0023482 A1 | 9/2001 | Wray |
| 2001/0029515 A1 | 10/2001 | Mirsky |
| 2001/0034795 A1 | 10/2001 | Moulton et al. |
| 2001/0039654 A1 | 11/2001 | Miyamoto |
| 2001/0048713 A1 | 12/2001 | Medlock et al. |
| 2001/0048714 A1 | 12/2001 | Jha |
| 2001/0050948 A1 | 12/2001 | Ramberg et al. |
| 2002/0010848 A1 | 1/2002 | Kamano et al. |
| 2002/0013799 A1 | 1/2002 | Blaker |
| 2002/0013937 A1 | 1/2002 | Ostanevich et al. |
| 2002/0015401 A1 * | 2/2002 | Subramanian et al. ........ 370/347 |
| 2002/0015435 A1 | 2/2002 | Rieken |
| 2002/0015439 A1 | 2/2002 | Kohli et al. |
| 2002/0023210 A1 | 2/2002 | Tuomenoksa et al. |
| 2002/0024942 A1 | 2/2002 | Tsuneki et al. |
| 2002/0024993 A1 | 2/2002 | Subramanian et al. |
| 2002/0031166 A1 | 3/2002 | Subramanian et al. |
| 2002/0032551 A1 | 3/2002 | Zakiya |
| 2002/0035623 A1 | 3/2002 | Lawande et al. |
| 2002/0041581 A1 | 4/2002 | Aramaki |
| 2002/0042907 A1 | 4/2002 | Yamanaka et al. |
| 2002/0061741 A1 | 5/2002 | Leung et al. |
| 2002/0069282 A1 | 6/2002 | Reisman |
| 2002/0072830 A1 | 6/2002 | Hunt |
| 2002/0078337 A1 | 6/2002 | Moreau et al. |
| 2002/0083305 A1 | 6/2002 | Renard et al. |
| 2002/0083423 A1 | 6/2002 | Ostanevich et al. |
| 2002/0087829 A1 | 7/2002 | Snyder et al. |
| 2002/0089348 A1 | 7/2002 | Langhammer |
| 2002/0101909 A1 | 8/2002 | Chen et al. |
| 2002/0107905 A1 | 8/2002 | Roe et al. |

| | | | |
|---|---|---|---|
| 2002/0107962 A1 | 8/2002 | Richter et al. | |
| 2002/0119803 A1 | 8/2002 | Bitterlich et al. | |
| 2002/0120672 A1 | 8/2002 | Butt et al. | |
| 2002/0133688 A1 | 9/2002 | Lee et al. | |
| 2002/0138716 A1 | 9/2002 | Master et al. | |
| 2002/0141489 A1 | 10/2002 | Imaizumi | |
| 2002/0147845 A1 | 10/2002 | Sanchez-Herrero et al. | |
| 2002/0159503 A1 | 10/2002 | Ramachandran | |
| 2002/0162026 A1 | 10/2002 | Neuman et al. | |
| 2002/0168018 A1 | 11/2002 | Scheuermann | |
| 2002/0181559 A1 | 12/2002 | Heidari-Bateni et al. | |
| 2002/0184275 A1 | 12/2002 | Dutta et al. | |
| 2002/0184291 A1 | 12/2002 | Hogenauer | |
| 2002/0184498 A1 | 12/2002 | Qi | |
| 2002/0191790 A1 | 12/2002 | Anand et al. | |
| 2003/0007606 A1 | 1/2003 | Suder et al. | |
| 2003/0012270 A1 | 1/2003 | Zhou et al. | |
| 2003/0018446 A1 | 1/2003 | Makowski et al. | |
| 2003/0018700 A1 | 1/2003 | Giroti et al. | |
| 2003/0023830 A1 | 1/2003 | Hogenauer | |
| 2003/0026242 A1 | 2/2003 | Jokinen et al. | |
| 2003/0030004 A1 | 2/2003 | Dixon et al. | |
| 2003/0046421 A1 | 3/2003 | Horvitz et al. | |
| 2003/0061260 A1* | 3/2003 | Rajkumar | 709/104 |
| 2003/0061311 A1 | 3/2003 | Lo | |
| 2003/0063656 A1 | 4/2003 | Rao et al. | |
| 2003/0074473 A1 | 4/2003 | Pham et al. | |
| 2003/0076815 A1 | 4/2003 | Miller et al. | |
| 2003/0099223 A1 | 5/2003 | Chang et al. | |
| 2003/0102889 A1 | 6/2003 | Master et al. | |
| 2003/0105949 A1 | 6/2003 | Master et al. | |
| 2003/0110485 A1 | 6/2003 | Lu et al. | |
| 2003/0131162 A1 | 7/2003 | Secatch et al. | |
| 2003/0142818 A1 | 7/2003 | Raghunathan et al. | |
| 2003/0154357 A1 | 8/2003 | Master et al. | |
| 2003/0163723 A1 | 8/2003 | Kozuch et al. | |
| 2003/0172138 A1 | 9/2003 | McCormack et al. | |
| 2003/0172139 A1 | 9/2003 | Srinivasan et al. | |
| 2003/0200538 A1 | 10/2003 | Ebeling et al. | |
| 2003/0212684 A1 | 11/2003 | Meyer et al. | |
| 2003/0229864 A1 | 12/2003 | Watkins | |
| 2004/0006584 A1 | 1/2004 | Vandeweerd | |
| 2004/0010645 A1 | 1/2004 | Scheuermann et al. | |
| 2004/0015970 A1 | 1/2004 | Scheuermann | |
| 2004/0015973 A1 | 1/2004 | Skovira | |
| 2004/0025159 A1 | 2/2004 | Scheuermann et al. | |
| 2004/0049672 A1* | 3/2004 | Nollet et al. | 713/100 |
| 2004/0057505 A1 | 3/2004 | Valio | |
| 2004/0062300 A1 | 4/2004 | McDonough et al. | |
| 2004/0081248 A1 | 4/2004 | Parolari | |
| 2004/0093479 A1 | 5/2004 | Ramchandran | |
| 2004/0133745 A1 | 7/2004 | Ramchandran | |
| 2004/0168044 A1 | 8/2004 | Ramchandran | |
| 2005/0044344 A1 | 2/2005 | Stevens | |
| 2005/0166038 A1 | 7/2005 | Wang et al. | |
| 2005/0166073 A1 | 7/2005 | Lee | |
| 2005/0198199 A1 | 9/2005 | Dowling | |
| 2005/0203988 A1* | 9/2005 | Nollet et al. | 709/201 |
| 2006/0031660 A1 | 2/2006 | Master et al. | |
| 2006/0168587 A1* | 7/2006 | Aslam-Mir | 718/105 |

FOREIGN PATENT DOCUMENTS

| | | |
|---|---|---|
| EP | 0 301 169 A1 | 2/1989 |
| EP | 0 166 586 B1 | 1/1991 |
| EP | 0 236 633 B1 | 5/1991 |
| EP | 0 478 624 B1 | 4/1992 |
| EP | 0 479 102 A2 | 4/1992 |
| EP | 0 661 831 A2 | 7/1995 |
| EP | 0 668 659 A2 | 8/1995 |
| EP | 0 690 588 A2 | 1/1996 |
| EP | 0 691 754 A2 | 1/1996 |
| EP | 0 768 602 A2 | 4/1997 |
| EP | 0 817 003 A2 | 1/1998 |
| EP | 0 821 495 A2 | 1/1998 |
| EP | 0 866 210 A2 | 9/1998 |
| EP | 0 923 247 A2 | 6/1999 |
| EP | 0 926 596 A2 | 6/1999 |
| EP | 1 056 217 A2 | 11/2000 |
| EP | 1 061 437 A1 | 12/2000 |
| EP | 1 061 443 A2 | 12/2000 |
| EP | 1 126 368 A2 | 8/2001 |
| EP | 1 150 506 A2 | 10/2001 |
| EP | 1 189 358 A1 | 3/2002 |
| GB | 2 067 800 A | 7/1981 |
| GB | 2 237 908 A | 5/1991 |
| JP | 62-249456 | 10/1987 |
| JP | 63-147258 | 6/1988 |
| JP | 4-51546 | 2/1992 |
| JP | 7-064789 | 3/1995 |
| JP | 7066718 | 3/1995 |
| JP | 10233676 | 9/1998 |
| JP | 10254696 | 9/1998 |
| JP | 11296345 | 10/1999 |
| JP | 2000315731 | 11/2000 |
| JP | 2001-053703 | 2/2001 |
| WO | WO 89/05029 A1 | 6/1989 |
| WO | WO 89/11443 A2 | 11/1989 |
| WO | WO 91/00238 A1 | 1/1991 |
| WO | WO 93/13603 A1 | 7/1993 |
| WO | WO 95/11855 A1 | 5/1995 |
| WO | WO 96/33558 A1 | 10/1996 |
| WO | WO 98/32071 A3 | 7/1998 |
| WO | WO 99/03776 A1 | 1/1999 |
| WO | WO 99/21094 A2 | 4/1999 |
| WO | WO 99/26860 A1 | 6/1999 |
| WO | WO 99/65818 A1 | 12/1999 |
| WO | WO 00/19311 A1 | 4/2000 |
| WO | WO 00/65855 A1 | 11/2000 |
| WO | WO 00/69073 A1 | 11/2000 |
| WO | WO 01/11281 A1 | 2/2001 |
| WO | WO 01/22235 A1 | 3/2001 |
| WO | WO 01/76129 A2 | 10/2001 |
| WO | WO 02/12978 A2 | 2/2002 |

OTHER PUBLICATIONS

Altera Apex 20K 1999.
Andraka Consulting Group, "Distributed Arithmetic," Obtained from: http://www.fpga-guru.com/distribu.htm (1998-2000).
Bickerstaff et al., "A Unified Turbo/Viterbi Channel Decoder for 3GPP Mobile Wireless in 0.18μ CMOS," IEEE *Journal of Solid-State Circuits* 37(11):1555-62 (2002).
Bogdan et al., "Power Reduction Techniques for a Viterbi Decoder Implementation,", 2000.
Chang et al., "Low-Power Bit-Serial Viterbi Decoder for Next Generation Wide-Band CDMA Systems,", Aug. 6, 2002.
Clark et al., "Error Correction Coding for Digital Communications," Plenum Press NY (1981).
Computer Organization and Design $2^{nd}$ Edition, Hennessy, Morgan Kaufmann Publishers, pp. 569-570 (1998).
Free On-Line Dictionary of Computing. © 1995-2000 www.foldoc.org search terms: cache, operating system, Internet, DMA, interrupt.
Garrett et al, "Low Power Architecture of the Soft-Output Viterbi Algorithm,".
Hanna et al., "A Normalized Backpropagation Learning Algorithm for Multilayer Feed-Forward Neural Adaptive Filters," *Neural Networks for Signal Processing XI*, Proceedings of the 2001 IEEE Signal Processing Society Workshop pp. 63-72 (Sep. 2001).
Hekstra, "An Alternative to Metric Rescaling in Viterbi Decoders," IEEE Transactions on Communications vol. 37 No. 11 (Nov. 1989).
Hendrix, "Viterbi Decoding Techniques in the TMS320C54x Family," Texas Instruments Application Note (Jun. 1996).
Janweijer et al., "A Compact Robin Using the SHarc (CRUSH)," Obtained from: http://www.nikhef.nl/~peterj/Crush/CRUSH-hw.pdf (Sep. 1998).
Kim et al, "Implementation of Convolutional Encoder and Viterbi Decoder for Wideband CDMA PCS Baseband Processing Unit Using Multiple TMS320C40s,".
Matache et al., "Trellis Coding for Diagonally Layered Space-Time Systems,".
Paaske et al., "High Speed Viterbi Decoder Architecture," First ESA Workshop on Tracking, Telemetry and Command Systems, ESTEC (Jun. 1998).
Rajagopalan et al., "A Flexible Multiplication Unit for an FPGA Logic Block," *Circuits and Systems* 4:546-9 (2001).

Röch et al., "Some New Results in Flow Shop Scheduling," Zeitschrift für Operations Research 28:1-16 (1983).
Verhoosel et al., "A Static Scheduling Algorithm for Distributed Hard Real-Time Systems," *Journal of Real-Time Systems* 3:227-46 (1991).
Xilinx Data Book 1998.
Xilinx Virtex 1.1 1998.
Xilinx Virtex 2.2 2000.
Xu et al., "Scheduling Processes with Release Times, Deadlines, Predence, and Exclusion Relations," IEEE Transactions on Software Engineering 16(3):360-9 (Mar. 1990).
Yeo et al., "Implementation of High Throughput Soft Output Viterbi Decoders," Proc. IEEE Workshop on Signal Processing Systems pp. 146-151 San Diego CA (Oct. 2002).
Abnous et al., "Ultra-Low-Power Domain-Specific Multimedia Processors," VLSI Signal Processing, IX, 1998, IEEE Workshop in San Francisco, CA, USA, Oct. 30-Nov. 1, 1998, pp. 461-470 (Oct. 30, 1998).
Aggarwal et al., "Efficient Huffman Decoding," International Conference on Image Processing IEEE 1:936-939 (Sep. 10-13, 2000).
Allan et al., "Software Pipelining," ACM Computing Surveys, 27(3):1-78 (Sep. 1995).
Alsolaim et al., "Architecture and Application of a Dynamically Reconfigurable Hardware Array for Future Mobile Communication Systems," Field Programmable Custom Computing Machines, 2000 IEEE Symposium, Napa Valley, Los Alamitos, CA. IEEE Comput. Soc. pp. 205-214 (Apr. 17-19, 2000).
Ashenden et al, "The VHDL Cookbook," Dept. Computer Science, University of Adelaide, South Australia. Downloaded from http://tams-www.informatik.uni-hamburg.de/vhdl/doc/cookbook/VHDL-Cookbook.pdf on Dec. 7, 2006 (Jul. 1990).
Bacon et al., "Compiler Transformations for High-Performance Computing," ACM Computing Surveys 26(4):368-373 (Dec. 1994).
Balasubramonian et al., "Reducing the Complexity of the Register File in Dynamic Superscalar Processors," Proceedings of the 34th Annual ACM/IEEE International Symposium on Microarchitecture, pp. 237-248 (Dec. 1, 2001).
Banerjee et al., "A MATLAB Compiler for Distributed, Heterogeneous, Reconfigurable Computing Systems," 2000 IEEE Symposium, pp. 39-48, (Apr. 17-19, 2000).
Bapte et al., "Uniform Execution Environment for Dynamic Reconfiguration," Darpa Adaptive Computing Systems, http://isis.vanderbilt.edu/publications/archive/babty_T_#_0_1999_Uniform_Ex.pdf, pp. 1-7 (1999).
Baumgarte et al., "PACT XPP—A Self-Reconfigurable Data Processing Architecture," NN www.pactcorp.com/sneu/download/ersa01.pdf; retrieved on Nov. 25, 2005 (Jun. 25, 2001).
Becker et al., "An Application—Tailored Dynamically Reconfigurable Hardware Architecture for Digital Baseband Processing," IEEE Conference Proceedings Article pp. 341-346 (Sep. 18, 2000).
Becker et al., "Design and Implementation of a Coarse-Grained Dynamically Reconfigurable Hardware Architecture," VLSI 2001, Proceedings IEEE Computer Soc. Workshop, Piscataway, NJ, USA, pp. 41-46 (Apr. 19-20, 2001).
Bevstar, BevStar Bottled Water Model Advertisement *Automatic Merchandiser* at www.AMonline.com (2005).
Bevstar, BevStar Point of Use Water Model Advertisement *Automatic Merchandiser* at www.AMOnline.com (2005).
Bishop & Loucks, "A Heterogeneous Environment for Hardware/Software Cosimulation," Proceedings of the 30th Annual Simulation Symposium, pp. 14-22 (Apr. 7-9, 1997).
Brakensiek et al., "Re-Configurable Multi-Standard Terminal for Heterogeneous Networks," Radio and Wireless Conference, Rawcon 2002 IEEE. pp. 27-30 (2002).
Brown et al., "Quick PDA Data Exchange," PC Magazine pp. 1-3 (May 22, 2001).
Buck et al., "Ptolemy: A Framework for Simulating and Prototyping Heterogeneous Systems," International Journal of Computer Simulation 4:155-182 (Apr. 1994).
Burns et al., "A Dynamic Reconfiguration Run-Time System," Proceedings of the 5th Annual Symposium on Field-Programmable Custom Computing Machines, pp. 166-75 (Apr. 16, 1997).
Business Wire, "Whirlpool Internet-Enabled Appliances to Use Beeline Shopper Software Features," http://www.whirlpoocorp.com/news/releases/release.asp?rid=90 (Feb. 16, 2001).
Buttazzo et al., "Optimal Deadline Assignment for Scheduling Soft Aperiodic Tasks in Hard Real-Time Environments," Engineering of Complex Computer Systems, Proceedings of the Third IEEE International Conference on Como, pp. 39-48 (Sep. 8, 1997).
Callahan et al., "Adapting Software Pipelining for Reconfigurable Computing," in Proceedings of the International Conference on Compilers, Architectrue and Synthesis for Embedded Systems p. 8, ACM (CASES '00, San Jose, CA) (Nov. 17-18, 2000).
Chapman & Mehrotra, "OpenMP and HPF: Integrating Two Paradigms," Proceedings of the 4th International Euro-Par Conference (Euro-Par'98), Springer-Verlag Heidelberg, Lecture Notes in Computer Science 1470:650-658 (1998).
Chen et al., "A Reconfigurable Multiprocessor IC for Rapid Prototyping of Algorithmic-Specific High-Speed DSP Data Paths," IEEE Journal of Solid-State Circuits, IEEE 35:74-75 (Feb. 1, 2001).
Clarke, "Embedded Solutions Enters Development Pact with Marconi," EETimes Online (Jan. 26, 2000).
Compton & Hauck, "Reconfigurable Computing. A Survey of Systems and Software," ACM Press, ACM Computing Surveys (CSUR) 34(2):171-210 (Jun. 2002).
Compton et al., "Configuration Relocation and Defragmentation for Run-Time Reconfigurable Computing," Northwestern University, http://citeseer.nj.nec.com/compton00configuration.html, pp. 1-17 (2000).
Conte et al., "Dynamic Rescheduling: A Technique for Object Code Compatibility in VLIW Architectures," Proceedings of the 28th Annual International Symposium on Microarchitecture pp. 208-218 (Nov. 29, 1995).
Conte et al., "Instruction Fetch Mechanisms for VLIW Architectures with Compressed Encodings," Proceedings of the Annual IEEE/ACM International Symposium on Microarchitecture (MICRO) 29:201-211 (Dec. 2, 1996).
Cray Research Inc., "Cray T3E Fortran Optimization Guide," Ver. 004-2518-002, Section 4.5 (Jan. 1999).
Cummings et al., "FPGA in the Software Radio," IEEE Communications Magazine . 37(2):108-112 (Feb. 1999).
Dandalis et al., "An Adaptive Cryptograhic Engine for IPSec Architectures," IEEE pp. 132-141 (Jan. 2000).
David et al., "DART: A Dynamically Reconfigurable Architecture Dealing with Future Mobile Telecommunication Constraints," Proceedings of the International Parallel and Distributed Processing Symposium pp. 156-163 (Apr. 15, 2002).
Deepakumara et al., "FPGA Implementation of MD5 has Algorithm," Canadian Conference on Electrical and Computer Engineering, IEEE (2001).
Dehon et al., "Reconfigurable Computing. What, Why and Implications for Design Automation," Design Automation Conference Proceedings pp. 610-615 (1999).
Dipert, "Figuring Out Reconfigurable Logic," EDN 44(16):107-114 (Aug. 5, 1999).
Dominikus, "A Hardware Implementation of IED4-Family Hash Algorithms," 9th International Conference on Electronics, Circuits and Systems IEEE (2002).
Dorband, "aCe C Language Reference Guide," Online (Archived Mar. 2001), http://web.archive.org/web/20000616053819/http://newton.gsfc.nasa.gov/aCe/aCe_dir/aCe_cc_Ref.html (Mar. 2001).
Drozdowski, "Scheduling Multiprocessor Tasks—An Overview," Instytut Informatyki Politechnika, pp. 1-31 (Jan. 31, 1996).
Ebeling et al., "RaPiD Reconfigurable Pipelined Datapath," Springer-Verlag, 6th International Workshop on Field-Programmable Logic and Applications pp. 126-135 (1996).
Fawer et al., "A Multiprocessor Approach for Implementing a Time-Diversity Spread Specturm Receiver," Proceeding sof the 1990 International Zurich Seminal on Digital Communications, pp. 173-180 (Mar. 5-8, 1990).
Fisher, "Gone Flat," Forbes pp. 76-79 (Oct. 2001).
Fleischmann et al., "Prototyping Networked Embedded Systems," Integrated Engineering, pp. 116-119 (Feb. 1999).
Forbes "Best of the Web—Computer Networking/Consumer Durables," *The Forbes Magnetic* 0 p. 80 (May 2001).

Gibson, "Fresh Technologies Will Create Myriad Functions," FT Information Technology Review; World Wide Web at http://technews.acm.org/articles/2000-2/0301w.html?searchterm=%22fresh+technologies%22 (Mar. 1, 2000).

Gluth, "Integrierte Signalprozessoren," Elektronik 35(18):112-118 Franzis Verlag GMBH, Munich, Germany (Sep. 5, 1986).

Gokhale & Schlesinger, "A Data Parallel C and Its Platforms," Proceedings of the Fifth Symposium on the Frontiers of Massively Parallel Computation pp. 194-202 (Frontiers '95) (Feb. 1995).

Grimm et al., "A System Architecture for Pervasive Computing," Washington University, pp. 1-6 (Sep. 2000).

Halbwachs et al., "The Synchronous Data Flow Programming Language LUSTRE," Proceedings of the IEEE 79(9):1305-1319 (Sep. 1991).

Hammes et al., "Cameron: High Level Language Compilation for Reconfigurable Systems," Proc. of the Intl. Conf. on Parallel Architectures and Compilation Techniques, pp. 236-244 (Oct. 1999).

Hartenstein, "Coarse Grain Reconfigurable Architectures," Design Automation Conference, 2001. Proceedings of the ASP-Dac 2001, Asian and South Pacific Jan. 30, 2001-Feb. 2, 2001, Piscataway, Nj, US, IEEE, pp. 564-569 (Jan. 30, 2001).

Heinz, "An Efficiently Compilable Extension of {M}odula-3 for Problem-Oriented Explicitly Parallel Programming," Proceedings of the Joint Symposium on Parallel Processing (May 1993).

Hinden et al., "The DARPA Internet Interconnecting Heterogeneous Computer Networks with Gateways," IEEE Computer Magazine pp. 38-48 (1983).

Horton, "Beginning Java 2: JDK 1.3 Edition," Wrox Press, Chapter 8, pp. 313-316 (Feb. 2001).

Huff et al., "Lifetime-Sensitive Modulo Scheduling," 6th Conference on Programming Language, Design and Implementation, pp. 258-267, ACM (1993).

IBM, "Multisequencing a Single Instruction Stream Scheduling with Space-time Tradeoffs," IBM Technical Disclosure Bulletin 36(2):105-108 (Feb. 1, 1993).

IEEE, "IEEE Standard Verilog Hardware Description Language," downloaded from http://insteecs.berkeley.edu/~cs150/fa06/Labs/verilog-ieee.pdf on Dec. 7,2006 (Sep. 2001).

Internet Wire, Sunbeam Joins Microsoft in University Plug and Play Forum to Establish a "Universal" Smart Appliance Technology Standard (Mar. 23, 2000).

Ishii et al., "Parallel Variable Length Decoding with Inverse Quantization for Software MPEG-2 Decoders," Workshop on Signal Processing Systems, Design and Implementation, IEEE pp. 500-509 (Nov. 3-5, 1997).

Isoworth, "Isoworth Beverage Dispensing Technology Worldwide Company," Brochure (May 22, 2000).

Jain et al., "An Alternative Approach Towards the Design of Control Units," Microelectronics and Reliability 24(6):1009-1012 (1984).

Jain, "Parallel Processing with the TMS320C40 Parallel Digital Signal Processor," Sonitech International Inc., pp. 13-46. Retrieved from: http://www-s.ti.com/sc/psheets/spra031/spra031.pdf retrieved on Apr. 14, 2004 (Feb. 1994).

Janssen et al., "Partitioned Register File for TTAs," Proceedings of the 28th Annual International Symposium on Microarchitecture, pp. 303-312 (Nov. 1995).

Jong-Pyng et al., "Real-Time Virtual Channel Flow Control," Proceedings of the Annual International Phoenix Conference on Computers and Communications, Conf. 13, pp. 97-103 (Apr. 12, 1994).

Jung et al., "Efficient Hardware Controller Synthesis for Synchronous Dataflow Graph in System Level Design," Proceedings of the 13th International Symposium on System Synthesis pp. 79-84 (ISSS'00) (Sep. 2000).

Kaufmann et al., "Digital Spread-Spectrum Multipath-Diversity Receiver for Indoor Communication," from Pioneers to the 21st Century; Denver, Proceedings of the Vehicular Technology Socity [sic] Conference, NY, IEEE, US 2(Conf. 42):1038-1041 (May 10-13, 1992).

Kneip et al., "An Algorithm Adapted Autonomous Controlling Concept for a Parallel Single-Chip Digital Signal Processor," Journal of VLSI Signal Processing Systems for Signal, Image, an dVideo Technology 16(1):31-40 (May 1, 1997).

Lee & Messerschmitt, "Pipeline Interleaved Programmable DSP's: Synchronous Data Flow Programming," IEEE Transactions on Acoustics, Speech, and Signal Processing ASSP-35(9):1334-1345 (Sep. 1987).

Lee & Messerschmitt, "Synchronous Data Flow," Proceedings of the IEEE 75(9):1235-1245 (Sep. 1987).

Lee & Parks, "Dataflow Process Networks," Proceedings of the IEEE 83(5):773-799 (May 1995).

Liu et al., "Scheduling Algorithms for Multiprogramming in a Hard-Real-Time Environment," Journal of the Association for Computing 20(1):46-61 (1973).

Llosa et al., "Lifetime-Sensitive Modulo Scheduling in a Production Environment," IEEE Trans. on Comps. 50(3):234-249 (Mar. 2001).

Lu et al., "The Morphosys Dynamically Reconfigurable System-On-Chip," Proceedings of the First NASA/DOD Workshop on Evolvable Hardware, pp. 152-160 Jul. 19, 1999).

Mangione-Smith et al., "Seeking Solutions in Configurable Computing," Computer 30(12):38-43 (Dec. 1997).

Manion, "Network CPU Adds Spice," Electronic Engineering Times, Issue 1126 (Aug. 14, 2000).

Mascia & Ishii., "Neural Net Implementation on Single-Chip Digital Signal Processor," IEEE (1989).

McGraw, "Parallel Functional Programming in Sisal: Fictions, Facts, and Future," Lawrence Livermore National Laboratory pp. 1-40 (Jul. 1993).

Najjar et al., "High-Level Language Abstraction for Reconfigurable Computing," Computer 36(8):63-69 (Aug. 2003).

Nichols et al., "Data Management and Control-Flow Constructs in a SIMD/SPMD Parallel Language/Compiler," Proceedings of the 3rd Symposium on the Frontiers of Massively Parallel Computation pp. 397-406 (Oct. 1990).

OpenMP Architecture Review Board, "OpenMP C and C++ Application Program Interface," pp. 7-16 (Oct. 1998).

Oracle Corporation, "Oracle8i JDBC Developer's Guide and Reference," Release 3, 8.1.7, pp. 10-8-10-10 (Jul. 2000).

Pauer et al., "Algorithm Analysis and Mapping Environment for Adaptive Computing Systems: Further Results," Proc. IEEE Symposium on FPGA's for Custom Computing Machines (FCCM), Napa CA (1999).

Pauer et al., "Algorithm Analysis and Mapping Environment for Adaptive Computing Systems," Presentation slides, Third Bi-annual Ptolemy Miniconference (1999).

Ramamritham et al., "On Scheduling Algorithms for Real-Time Multiprocessor Systems," Algorithms and Applications, Proceedings of the International conference on Parallel Processing 3:143-152 (Aug. 8, 1989).

Schneider, "A Parallel/Serial Trade-Off Methodology for Look-Up Table Based Decoders," Proceedings of the Design Automation Conference 34:498-503 (Jun. 9-13, 1997).

Sidhu et al., "A Self-Reconfigurable Gate Array Architecture," 10 International Workshop on Field Programmable Logic and Applications http://coblitz.codeen.org:3125/citeseer.ist.psu.edu/cache/papers/cs/17524/http:zSzzSzmaarcii.usc.eduzSzPublicationsZSzsidhu_fp100.pdf/sidhu00selfreconfigurable.pdf retrieved on Jun. 21, 2006 (Sep. 1, 2001).

Smith, "Intro to ASICs: ASIC Cell Libraries," at http://iroi.seu.edu.cn/books/asics/Book2/CH01/CH01.5.htm, printed on Feb. 4, 2005 (Jun. 1997).

Souza., "Computing's New Face—Reconfigurable Devices Could Rattle Supply Chain," Electronic Buyers' News Issue 1205, p. P.1 (Apr. 3, 2000).

Souza, "Quicksilver Buys White Eagle," Electronic Buyers News, Issue 1220 (Jul. 17, 2000).

Sriram et al., "MPEG-2 Video Decoding on the TMS320C6X DSP Architecture," Conference Record of the 32nd Asilomar Conference on Signals, Systems, and Computers, IEEE pp. 1735-1739 (Nov. 1-4, 1998).

Steiner, "Coke Chiefs Latest Daft Idea—A Cola Tap in Every House," Sunday Times (Mar. 2001).

Sun Microsystems, "FORTRAN 3.0.1 User's Guide, Revision A," pp. 57-68 (Aug. 1994).

Svensson, "Co's Join on Home Web Wiring Network," Associated Press Online printed on Apr. 30, 2008 (Jun. 2000).

Tang et al., "Thread Partitioning and Scheduling Based on Cost Model," Proceedings of the Ninth Annual ACM Symposium on Parallel Algorithms and Architectures, pp. 272-281 Retrieved from: http://doi.acm.org/10.1145/258492.2585 retrieved on Aug. 25, 2004 (1997).

Vaya, "VITURBO: A Reconfigurable Architecture for Ubiquitous Wireless Networks," A Thesis Submitted in Partial Fulfillment of the Requirements for the Degree Master of Science; Rice University (Aug. 2002).

Wang et al., "Cell Search in W-CDMA," IEEE Journal on Selected Areas in Communications 18(8):1470-1482 (Aug. 2000).

Wardell, "Help for Hurried Cooks?," Popular Science, p. 32 (May 2000).

Whiting & Pascoe, "A History of Data-Flow Languages," IEEE Annals of the History of Computing 16(4):38-59 (1994).

Williamson & Lee, "Synthesis of Parallel Hardware Implementations from Synchronous Dataflow Graph Specifications," Conference Record of the Thirtieth Asilomar Conference on Signals, Systems and Computers 1340-1343 (Nov. 1996).

Wirthlin et al., "A Dynamic Instruction Set Computer," Proceedings of the IEEE Symposium on FPGA's for Custom Computing Machines, pp. 99-107 (Apr. 21, 1995).

WWW.APPLIANCEMAGAZINE.COM, World Wide Web at http://web.archive.org/web/20000511085402/http://www.appliancemagazine.com/ printed on Apr. 30, 2008.

WWW.BESTROM.COM, BreakMateTM from www.bestrom.com printed on Apr. 29, 2008.

WWW.BEVERAGEEXPRESS.COM, Beverage Express from www.beverageexpress.com printed on Apr. 30, 2008.

WWW.BEVSTAR.COM, lsoworth Beverage Dispensing Technology Worldwide from www.bevstar.com printed on Apr. 30, 2008.

WWW.BONATOR.COM, from the World Wide Web at http://web.archive.org/web/20000510102440/http://www.bonator.com/ printed on Apr. 30, 2008.

WWW.ECOMMERCE.DEWPOINTINC.COM, Swiss Mountain Coffees from www.ecommerce.dewpointinc.com printed on Apr. 30, 2008.

WWW.GATEWAY.COM, World Wide Web, http://web.archive.org/web/20000229192734/www.gateway.com/productpages/9300splash/index.shtml Available on Mar. 3, 2000, 1 page (Mar. 3, 2000).

WWW.ICL.COM, from the World Wide Web at http://www.icl.com printed on Apr. 30, 2008.

WWW.MARGHERITA2000.COM: from Margherita2000.com printed Apr. 30, 2008 (Jan. 26, 2001).

WWW.SODACLUBENTERPRISES.COM, Soda-Club Enterprises from www.sodaclubenterprises.com printed on Apr. 30, 2008.

WWW.SYMBOL.COM, Symbol from www.symbol.com printed on Apr. 30, 2008.

WWW.WUNDERBAR.COM, Wunder-Bar Dispensing Systems from www.wunderbar.com printed on Apr. 30, 2008.

Xilinx, "Virtex-II Pro Platform FPGAs: Functional Description DS083-2 (v2.5)," Product Specification, pp. 13-46 (Jan. 20, 2003).

Young, "Architecture Powers up IPSec, SSL," EETimes, Los Gatos, CA, pp. 1-4 http://www.eetimes.com/story/OEG20011102S0065 (Nov. 2, 2001).

Yuan et al., "A Decomposition Approach to Non-Preemptive Real-Time Scheduling," Real Time Systems 6(1):7-35 (1994).

Zaino et al., "Algorithm Analysis and Mapping Environment for Adaptive Computing Systems," Final Technical Report, DARPA Contract F33615-97-C-1174 (Sep. 2001).

Zhang et al., "A 1V Heterogeneous Reconfigurable Processor IC for Baseband Wireless Applications," 2000 IEEE Solid.

* cited by examiner

TASK DEFINITION FOR SPECIFYING RESOURCE REQUIREMENTS

BACKGROUND OF THE INVENTION

This application is generally related to digital processing systems, and more specifically to digital processing systems having multiple processing nodes.

In configurable systems, it is typically desirable to be able to execute multiple tasks concurrently. If some or all of these tasks have timing constraints (for example, if "real-time" operation is desired), the configurability of the system may be limited. This can be explained with reference to typical methodologies used to implement real-time systems.

Early real-time systems were often "hand crafted" in order to meet stringent timing constraints. In particular, real-time tasks that were to be executed concurrently were analyzed to determine their detailed timing requirements. Then, a real-time operating system was "built around" these tasks such that their timing requirements were satisfied. Because such real-time systems are tied so closely with the underlying tasks, they are not easily modifiable or extendible. For example, attempting to modify a task or add an additional task to the system could require a complete re-design of the system.

In order to make such systems "configurable," the possible configurations are typically first determined and fixed, and then the system is designed to accommodate the timing constraints of the various possible configurations. If it is desired to add a new configuration or feature, detailed knowledge of the entire system, including knowledge of tasks that might be executed at any particular time, is typically required in order to ensure that the system can execute tasks in "real-time" under the various configurations. Alternatively, the entire system might need to be re-designed. Thus, the design of the system, and that of individual tasks that are to be executed, is typically tightly controlled. This can make it difficult to add new configurations to a device, and/or to permit third-parties to develop configurations for the device.

A more flexible approach to real-time systems is often referred to as the "scheduled reservation model." Under the scheduled reservation model, the processor is viewed as a quantifiable resource that can be reserved like physical memory or disk blocks. But if two tasks require processor resources simultaneously, then one of the tasks will have to wait until the other is finished. If this task must wait too long, then it may not be able to execute in "real-time." Thus, the scheduled reservation model cannot guarantee real-time execution of all tasks.

The scheduled reservation model provides a more flexible approach to design of real-time systems. In particular, design of a task or tasks does not require detailed knowledge of the entire system and/or other tasks. Thus, unlike "hand-crafted" real-time systems, task design need not be tightly controlled, and new configurations and/or features can be developed by those (e.g., third parties, etc.) without detailed knowledge of the system or of other tasks that may run on the system. For example, new features could be developed for a configurable device without requiring any changes to the underlying system or with other tasks previously designed for the system. Further, such features could be developed by third-parties with limited knowledge of the underlying system and/or of other features. As discussed above, however, "real-time" operation might not be guaranteed.

Another approach to real-time systems is often referred to as the "fixed priority model." Under the fixed priority model, each task is assigned a priority level by developers. During operation, tasks are executed strictly based on their priority level. For example, a task with a higher priority than that of an executing task can interrupt that task, whereas a task with a lower priority than that of the executing task must wait until the executing task finishes. As with the scheduled reservation model, the fixed priority model cannot guarantee real-time execution of tasks (except for the highest priority task).

As with the scheduled reservation model, the fixed priority model provides a more flexible approach to design of real-time systems. In particular, design of a task or tasks does not require detailed knowledge of the entire system and/or other tasks. It does, however, require some knowledge of its priority vis-à-vis other tasks that may be executed by the system. Thus, task design need not be tightly controlled, but does usually require some degree of coordination. Thus, similar to systems employing a scheduled reservation model, new features for could be developed for a configurable device without requiring significant changes to the underlying system or with other tasks previously designed for the system. It may, however, require a reconfiguration of priorities of tasks that can be implemented on the device. Additionally, such features could be developed by third-parties with limited knowledge of the underlying system and/or of other features. But, "real-time" operation cannot be guaranteed.

Configurable systems having multiple processing nodes generally exacerbate the above-mentioned shortcomings and introduce others. It is desirable to provide techniques for use in configurable systems having multiple processing nodes that improve upon one or more of the above-mentioned (or other) shortcomings in the prior art.

BRIEF SUMMARY OF THE INVENTION

Task definitions are used by a task scheduler and prioritizer to allocate task operations to a plurality of processing units. The task definition is an electronic record that specifies resources needed by, and other characteristics of, a task to be executed. Resources include types of processing nodes desired to execute the task, needed amount or rate of processing cycles, amount of memory capacity, number of registers, input/output ports, buffer sizes, etc. Characteristics of a task include maximum latency time, frequency of execution of a task communication ports, and other characteristics.

An examplary task definition language and syntax is described that uses constructs including order of attempted scheduling operations, percentage or amount of resources desired by different operations, handling of multiple executable images or modules, overlays, port aliases and other features.

In one embodiment the invention provides a computer program product comprising a computer readable storage structure embodying computer readable code therein, the computer readable code comprising a task definition code that specifies requirements of a task adapted to be executed on a configurable device having a plurality of processing nodes, the task definition code including code that indicates processing node resources required by the task.

In another embodiment the invention provides a computer data signal embodied in a carrier wave, the computer data signal comprising a task definition code that specifies requirements of a task adapted to be executed on a configurable device having a plurality of processing nodes, the task definition code including code that indicates processing node resources required by the task.

In another embodiment the invention provides a configurable device comprising a plurality of processing nodes; a scheduler, coupled to the plurality of processing nodes, tha t assigns tasks to the processing nodes for execution; and a memory, coupled to the scheduler, the memory including a task definition code that specifies requirements of at least one task adapted to be executed by the configurable device, the task definition code having code that indicates processing node resources required by the task.

DETAILED DESCRIPTION OF THE INVENTION

Overview

Embodiments according to the present invention provide techniques for defining tasks to be implemented on a configurable device. In some specific embodiments, the target device includes a plurality of processing nodes on which tasks can be executed. In these embodiments, processing nodes can include one or more of common types of processing resources such as general purpose processors, general purpose digital signal processors, special purpose processors, finite-state machines (FSMs), application—specific integrated circuits (ASICs), etc.

Figure 1:
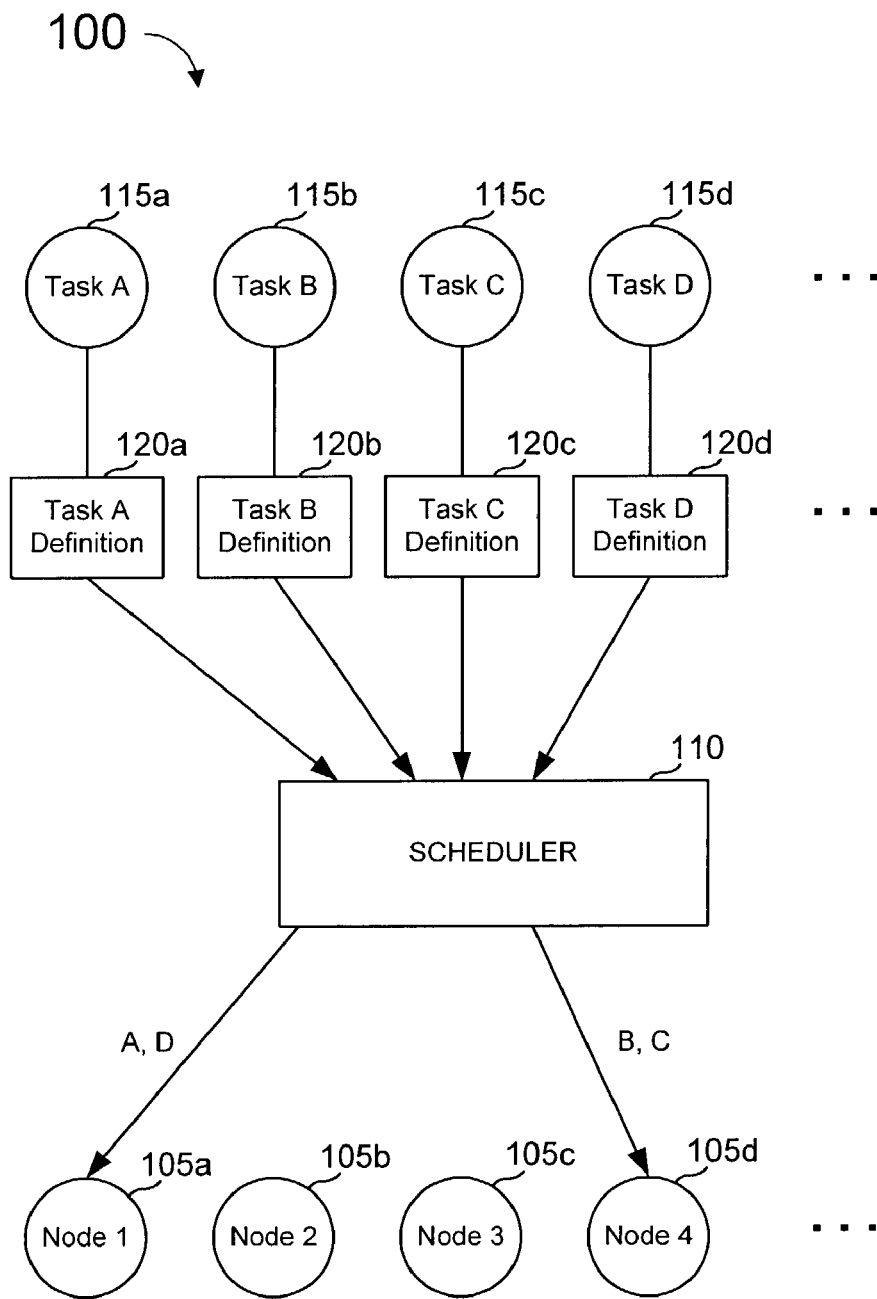
FIG. 1 is a simplified block diagram illustrating an example of a system that can use embodiments of the present invention.

FIG. 1 is a simplified block diagram illustrating an example of a system that uses embodiments of the present invention. The system 100 includes a plurality of processing nodes 105a, 105b, 105c, 105d, . . . , and a scheduler 110. Scheduler 110 determines which of tasks 115a, 115b, 115c, 115d, . . . are to be carried out on which of the nodes 105a, 105b, 105c, 105d, . . . For example, as illustrated in FIG. 1, scheduler 110 has assigned tasks A and D for execution on node 1, and has assigned tasks B and C for execution on node 4.

Associated with each of tasks 115a, 115b, 115c, 115d, is a corresponding task definition (120a, 120b, 120c, 120d, . . . ). As is described subsequently, task definitions 120a, 120b, 120c, 120d, . . . provide information about their associated tasks. Such information can include a type of processing node required (or merely desired) to execute the task, required (or desired) processing resources, other required (or desired) resources (e.g., memory, buffers, ports, etc.), information for communicating with the task, etc.

Scheduler 110 can use information provided by task definitions 120a, 120b, 120c, 120d, . . . in order to assign tasks 115a, 115b, 115c, 115d to processing nodes 105a, 105b, 105c, 105d, . . . for execution in an attempt to satisfy the requirements of the tasks spelled out in the task definitions.

U.S. patent application Ser. No. 10/189,791, to Paul L. Spoltore, et al., entitled "Method and System for Real-Time Multitasking," filed Jul. 3, 2002 (hereinafter "Spoltore et al."), which is herein incorporated by reference in its entirety for all purposes, describes techniques for assigning tasks to processing nodes for execution. In a specific embodiment, scheduler 110 can use one or more of the techniques described in Spoltore et al. to assign 115a, 115b, 115c, 115d to processing nodes 105a, 105b, 105c, 105d, . . . for execution.

A Configurable Device

Figure 2:
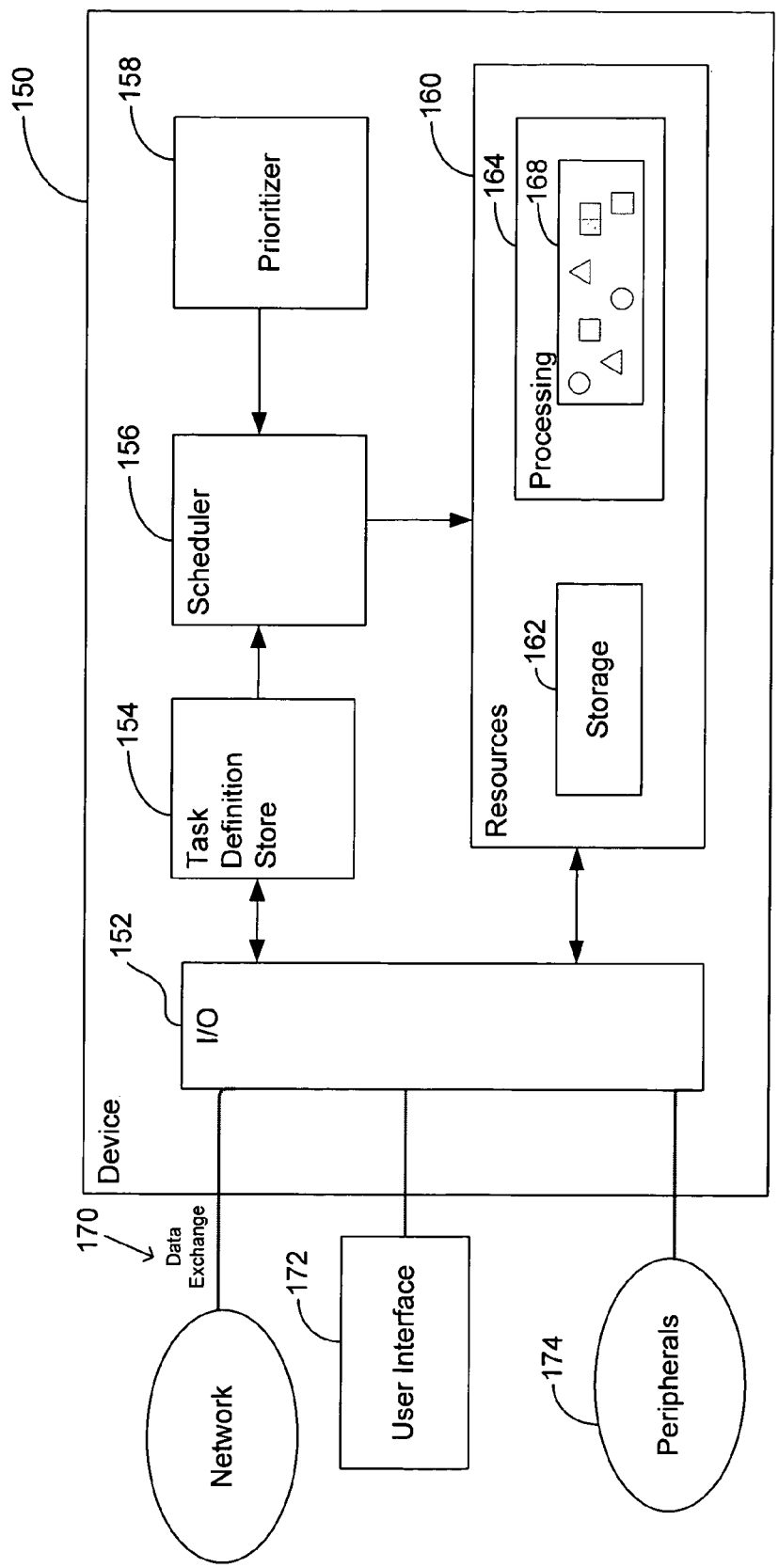
FIG. 2 is a simplified block diagram of an example of a device that can implement tasks that have been defined according to embodiments of the present invention.

FIG. 2 is a simplified block diagram of an example of a device 150 that can implement tasks that have been defined according to embodiments of the present invention. It should be apparent, however, that aspects of the apparatus and methods described herein can be applied to many different types of computing architectures including, for example, general purpose processors, digital signal processors, custom integrated circuits, discrete circuits, etc. Additionally, aspects of the apparatus and methods described herein can be applied, in general, to any type of processing approach including, parallel processing, distributed processing, synchronous processing, asynchronous processing, etc.

Device 150 can be, for example, a consumer electronics device (or a component thereof) such as a cell phone, pager, personal digital assistant (PDA), global positioning system (GPS) receiver, etc. It should be apparent, however, that device 150 can be any type of device that can benefit from a processing engine.

Device 150 includes input/output (I/O) system 152 for providing data exchange with the external environment (illustrated at 170), connection to peripherals 174, and interaction with a human user via user interface 172. Data exchange includes exchanges with digital networks such as an internet, the Internet, an intranet, an extranet, communication infrastructures such as a telephone network, radio frequency exchanges as to wireless networks, etc. Any type of physical communication or data transfer network can be employed. Any type of protocol can be used to perform the communication.

User interface 172 allows a human user to operate the device, and to perform other functions. Typically, a user interface includes a display screen and manual controls such as buttons, a pointing device (e.g., a mouse, trackball, touchpad, etc.), knobs, switches, and other types of controls. Additional output devices can include speakers, force feedback, etc. Peripherals 174 include storage devices such as disk drives, input/output devices such as keyboards, monitors, etc.

I/O system 152 can be in communication with different systems in device 150. For example, FIG. 2 shows I/O system 152 communicating with task definition store 154 and storage and processing resources 160. Other arrangements are possible.

Task definition store 154 is used to store programs, adaptation or configuration information, or other information used to control or manage the processing or functioning of device 150. In one embodiment, adaptation information is used to define tasks that are executed by systems within device 150 to achieve functionality. For example, one or more tasks might allow device 150 to communicate using time-division multiplexed access (TDMA) with a cellular phone network. One or more other tasks could provide a user with a phone directory including an interface for creating, modifying, organizing, searching, etc., the directory. Yet other tasks can implement a time-of-day clock, Internet web browsing, GPS position indication, calculator, email interface, etc. In general, any type of functionality can be implemented by a task. Combinations of functionality can be provided by one or more tasks. Further, a task may implement only a portion of a feature, function, or other process or functionality.

Scheduler 156 causes tasks, or portions of tasks, from task definition store 154 to be executed. Scheduler 156 can, optionally, use information provided by prioritizer 158 in determining how to specify the use of resources 160 to be used to execute a task. For example, scheduler 156 can assign all resources to a task that has been given a high priority by prioritizer 158. Conversely, scheduler 156 may reduce resources allocated to a task, or suspend execution of a task, if the task has a low priority.

Resources 160 include storage 162 and processing resources 164. Storage 162 can be, for example, system memory in the form of random-access memory (RAM), or other forms of storage. Storage 162 can be distributed throughout the processing elements, it can be centralized, or it can be a combination of centralized and distributed storage. Processing resources 164 can include one or more of common types of processing resources such as general purpose processors, FSMs, ASICs, etc. In one embodiment, processing resources 164 include multiple processing nodes 168 according to the adaptive computing engine ("ACE")architecture as described in U.S. patent application Ser. No. 09/815,122, entitled "Adaptive Integrated Circuitry With Heterogeneous And Reconfigurable Matrices Of Diverse And Adaptive Computational Units Having Fixed, Application Specific Computational Elements," filed Mar. 22, 2001 ("Masters"). In this embodiment, each node 168 can be of a specific type, such as math, bit/logical, FSM, reduced-instruction set computing (RISC), etc. In this embodiment, nodes are interconnected and may have associated resources, such as memory. A detailed description of the ACE architecture is provided in Masters, which is herein incorporated by reference in its entirety for all purposes. In other embodiments, all of the nodes may be general purpose or of one type.

Task Definition

Embodiments of task definitions according to the present invention will now be described. In these embodiments, a task is comprised of one or more modules, and the requirements of each module can be specified in the task definition. It is to be understood, however, that it is not a requirement that tasks be defined in terms of modules. This is merely an example of one implementation, and one skilled in the art will recognize many modifications, equivalents, and alternatives. For example, in other embodiments, a task may not be specified in terms of modules that make up the task. In still other embodiments, a task may comprise one or more modules, where each module may in turn be comprised of one or more sub-modules. In these embodiments, a task may be specified in terms of sub-modules.

Referring to FIG. 2, in embodiments to be used with systems such as device 150, task definitions may be stored in task definition store 154. In these embodiments, tasks and task definitions can be, for example, downloaded by device 150 from a remote location. For instance, with a device 150 that includes, or is coupled with, a modem, network interface, etc., a task definition could be transmitted to device 150 via a computer data signal embodied on a carrier wave, over a network such as the Internet, etc., and then loaded into task definition store 54. Similarly, a task definition could be transmitted to a computer, and then downloaded from the computer to task definition store 154 via, for example, a serial port, parallel port, etc. In other embodiments in which device 150 includes, or is coupled with, a floppy disk drive, memory card reader, etc., task definitions could be loaded into task definition store 154 via a computer readable medium such as a disk, memory card, etc.

As described above, task definitions are associated with the tasks of which they provide information. In some embodiments, task definition may include a link, pointer, etc., to the task to which it is associated, or a location of the task in a memory, etc. In other embodiments, the task definition may be included with the task itself. For example, a task definition may be within a same file as the task itself, appended to the file, etc.

The type of information provided by task definitions will now be described. Some of this information can be used, for example, by scheduler 110 of FIG. 1, scheduler 156 of FIG. 2, an operating system, etc., to determine to which processing nodes tasks should be assigned or loaded, by which processing nodes tasks should be executed, etc. Additionally, some of this information can be used by an operating system, other tasks, etc., to communicate with, provide information to, etc., a task.

A. Processing Node Resources

In some embodiments, a task definition may specify resources of a processing node that are required (or desired) by the associated task. The resources could be specified, for example, in terms of a percentage of the processing node's processing power. Examples of source code for specifying processing node resources is provided subsequently.

The time between when a task can begin to execute (e.g., when data becomes available, a trigger occurs, etc.) and when the task actually begins to execute will be referred to herein as "latency." For some tasks, it may be desired that the latency not exceed (or only occasionally exceed) some maximum amount (herein referred to as the "maximum allowable latency"). Thus, in some embodiments, specifying resource requirements of a task can include specifying a maximum allowable latency. A maximum allowable latency could be specified, for example, in units of time, clock cycles, etc.

In some embodiments, specifying resource requirements of a task can include specifying a minimum amount of time required to execute the task. Time required could be specified, for example, in units of time, clock cycles, etc.

In some embodiments, specifying resource requirements of a task can include specifying a minimum frequency of execution of the task. The frequency of execution could be specified, for example, in units of time (period), clock cycles (period), hertz (frequency), etc.

Spoltore et al. describes various types of resource requirements that, in some embodiments, can be included in task definitions.

B. Processing Node Type

In some embodiments in which a device on which the task can be executed includes processing nodes of different types, a task definition may specify the type of a processing node required (or desired) by the associated task. For example, as described with respect to FIG. 2, device 150 can include one or more of common types of processing resources such as general purpose processors, FSMs, ASICs, etc. In one specific embodiment, device 150 includes multiple processing nodes according to the ACE architecture as described in Masters. In this embodiment, each node is of a specific type, such as math, bit/logical, FSM, or reduced-instruction set computing (RISC).

In some embodiments, a preferred choice of processing node type can be specified, as well as one or more back-up choices. In these embodiments, if the preferred type of processing node is unavailable, the task can be assigned to a processing node of one of the back-up choice types.

C. Other Resources

In some embodiments, a task definition may specify other types of required (or desired) resources. For example, a task definition may specify memory requirements, such as a minimum amount of memory, a maximum amount of memory, a type of memory, etc. Also for example, a task definition may specify input/output (I/O) requirements such as buffer requirements, I/O port requirements, etc. In some embodiments, I/O requirements can be specified, for example, in terms of a minimum buffer size, a maximum buffer size, a minimum throughput, a maximum throughput, a type of input, output, or I/O port, a specific input, output, or I/O port, etc. Examples of source code for specifying requirements of buffers will be described subsequently.

D. Port Aliases

In some embodiments, a task definition can include port aliases used for communicating between tasks, within a task, between a task and the operating system, etc. Ports can be, for example, I/O ports, registers, memories, sections of memories, etc., used for providing information to, or receiving information from, tasks. For instance, a task definition can include global alias names of ports for communicating with the task. Examples of source code for specifying port aliases will be described subsequently.

E. Task Loading

In some embodiments, a task definition can include requirements for loading the task. For example, a task definition can specify whether the task should be loaded for execution on a particular node, or within a particular group of nodes. Additionally, in some embodiments, a task definition can specify whether a task should be loaded for execution on a node on which another particular task or tasks is loaded for execution, or near a node or nodes on which another particular task or tasks is loaded for execution.

As described above, in some embodiments a task may comprise one or more modules. In these embodiments, a task definition can specify requirements relating to the node or nodes on which the modules should be loaded for execution. For instance, a task definition can specify that a particular module be loaded on a particular node or within a group of nodes. Also, a task definition can specify that two or more particular modules be loaded on a same node, or within one group of nodes. Similarly, a task definition can specify that two or more particular modules be loaded on different nodes, or on different groups of nodes. In some embodiments, a task definition can specify loading requirements for some modules while not specifying such requirements for other modules.

EXAMPLES

Examples of source code for implementing task definitions will now be described. It is to be understood that these examples are merely illustrative and are not limiting.

A. Module Definition

In some embodiments in which a task can comprise one or more modules, a task definition includes a module definition section. An example of source code included within a module definition section is provided below. In this example, a module definition section begins with a name indicating the module to be defined, followed by parentheses and brackets:

```
modSample("modSample_EntryPoint", "m_node_files/
modSample.mlf") {
    .
    .
    .
}
```

In the above example, a filename of an executable image of the module and an entry point within the file are specified within the parentheses. In particular, the filename of an executable images is "modSample.mlf" located in the directory "m_node_files." Additionally, the entry point is "modSample_EntryPoint." Within the brackets, other requirements of the module can be specified required, as will be described subsequently.

In some embodiments, multiple file names can be specified, corresponding to alternative executable images of the module. For example, if different types of nodes require different formats, different code, etc., then one or more alternative executable images can be specified in case a particular node type is unavailable, for example, because the device on which the module is to be executed does not include it, because all nodes of this type have already been reserved by other modules, etc. In the following example, it is assumed that a device on which the module could be loaded might include two types of processing nodes: m-type nodes and a-type nodes. A required (or desired) type of node for a particular node can be specified by the filename extension of the executable image of the module. In this particular example, a ".mlf" extension indicates, for example, to an operating system, to a scheduler, etc., that the module should be loaded to an m-type node, whereas a ".alf" extension indicates that the module should be loaded to an a-type node:

```
modSample("modSample_EntryPoint", "m_node_files/modSample.mlf",
    "a_node_files/modSample.alf") {
    .
    .
    .
}
```

In the above example, the task definition specifies that the operating system, scheduler, etc., should first attempt to load the file named "modSample.mlf" to an m-type node (or, alternatively, to a node that supports an m-type format). If there is no such processing node available, then it should be attempted to load the file named "modSample.alf" to an appropriate processing node.

In some embodiments, multiple instances of a module can be loaded and executed. An example of source code included within a module definition section that defines multiple images of a module is provided below. In this example, two instances are defined which reference the same executable image "modSample.mlf":

```
modSample1("modSample_EntryPoint",
    "m_node_files/modSample.mlf") {
    .
    .
    .
}
modSample2("modSample_EntryPoint",
    "m_node_files/modSample.mlf") {
    .
    .
    .
}
```

B. Module Resources Definition

The source code examples below illustrate one specific embodiment of a task definition that specifies node resources for a module. A keyword "cpu" followed by a number between 0 and 100 (inclusive) is used to specify a percentage of required processing resources of a node. In the following example, required processing node resources for the module whose executable image is included in the file "modSample.mlf" are specified. In particular, this module requires 25% of the processing node's processing power:

```
modSample("modSample_EntryPoint",
    "m_node_files/modSample.mlf") {
    .
```

```
            resource( ) {
                .
                .
                .
                cpu 25
                .
                .
                .
            }
            .
            .
            .
        }
```

The granularity of the number specifying processing power can vary with different implementations, different devices on which the module is to be executed, different types of processing nodes, etc. For example, the granularity can be in units of 1, 5, 10, 25, etc. If desired, a smaller granularity can also be used.

If multiple executable images of a module are defined, required processing resources can be specified as the same for both images, or specified individually. In the following example, required processing resources for two executable images of a module ("m_node_files/modSample.mlf" and "a_node_files/modSample.alf") are specified as having the same resource requirement:

```
modSample("modSample_EntryPoint", "m_node_files/modSample.mlf",
    "a_node_files/modSample.alf") {
    .
    .
    .
    resource( ) {
        .
        .
        .
        cpu 25
        .
        .
        .
    }
    .
    .
    .
}
```

In the following example, required processing resources for two executable images of a module ("m_node_files/modSample.mlf" and "a_node_files/modSample.alf") are specified as having the different resource requirement:

```
modSample("modSample_EntryPoint", "m_node_files/modSample.mlf",
    "a_node_files/modSample.alf") {
    .
    .
    .
    resource("m_node_files/modSample.mlf") {
        .
        .
        .
        cpu 75
        .
        .
        .
    }
```

```
    resource("a_node_files/modSample.alf") {
        .
        .
        .
        cpu 25
        .
        .
        .
    }
    .
    .
    .
}
```

C. Module Overlay Definition

In some embodiments, use of overlays is permitted. A source code example of a task definition that specifies overlay requirements is provided below. In this example, the keyword "overlays" is used followed by parentheses and brackets. The parentheses can be used to specify a particular executable image of a module. If only one executable image has been defined, or if the overlays are the same for the different executable images, the parentheses can be left empty. Within the brackets, the entry points and files of one or more overlays can be specified:

```
modSample("modSample_EntryPoint",
    "m_node_files/modSample.mlf") {
    .
    .
    .
    overlays( ) {
        "Overlay_EntryPoint", "m_node_files/modOverlay1.mlf"
        "Overlay_EntryPoint", "m_node_files/modOverlay2.mlf"
        "Overlay_EntryPoint", "m_node_files/modOverlay3.mlf"
    }
    .
    .
    .
}
```

In the above example, three overlays are defined. This information can be used, for example, to ensure that enough memory is reserved for the module when it is loaded. For instance, in the above example, an operating system could reserve an amount of memory greater than or equal to the size of the executable image "modSample.mlf" plus the size of the largest of the three overlay files.

D. Port Aliases

In some embodiments, a task definition includes a port alias section. An example of source code that illustrates port aliases is provided below. In this example, a alias section is followed by a module definition section:

```
    inBuf_public 0
    outBuf_public 0
    .
    .
    .
    modSample("modSample_EntryPoint",
        "m_node_files/modSample.mlf") {
        inBuf_private inBuf_public
        outBuf_private outBuf_public
        .
        .
        .
    }
```

In the above example, two global aliases are defined: "inBuf_public" and "outBuf_public." These aliases identify ports that can be used to communicate with the module "modSample." The "0" following each of these port aliases specify that the ports requirements are default values. Source code examples of specifying requirments of ports will be described subsequently.

Within the module definition section, the global alias names are linked to internal port names of the module: "inBuf_private" and "outBuf_private." This can be useful, for example, when multiple instances of the same module are to be loaded. And example of using port aliases with multiple module instances is provided below:

```
        inBuf_public 0
        xfrBuf_public 0
        outBuf_public 0
        .
        .
        .
        modSample1("modSample_EntryPoint",
        "m_node_files/modSample.mlf") {
            inBuf_private inBuf_public
            outBuf_private xfrBuf_public
            .
            .
            .
        }
        modSample2("modSample_EntryPoint",
        "m_node_files/modSample.mlf") {
            inBuf_private xfrBuf_public
            outBuf_private outBuf_public
            .
            .
            .
        }
```

Figure 3:
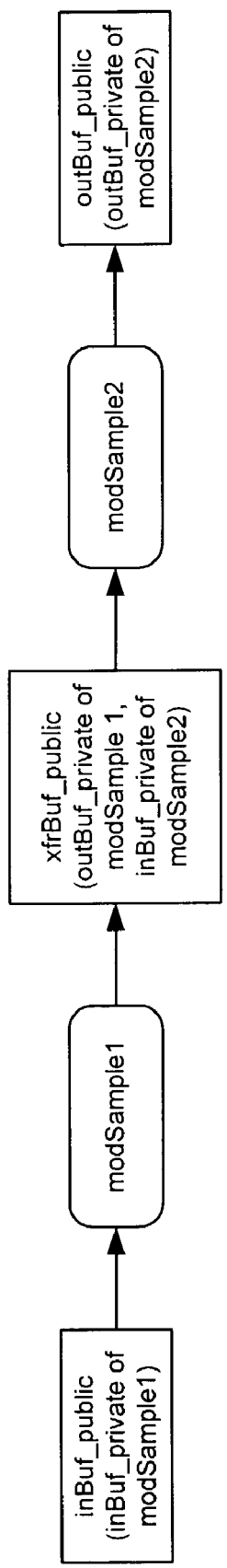
FIG. 3 is a simplified diagram illustrating a linking of ports and modules as specified by a task definition.

In the above example, two instances of the same module are to be loaded, and three global aliases are defined. The private aliases of the two module instances are linked with the public aliases such that the ports will be interfaced as shown in FIG. 3.

E. Port Resource Definition

As described above, in some embodiments, a task definition may specify input/output (I/O) requirements such as buffer requirements, I/O port requirements, etc. Examples of source code for specifying requirements of buffers are provided below. In the following example, requirements of two ports are specified:

```
        inBuf_public 512
        outBuf_public 256, 64, 4, 2046
        .
        .
        .
        modSample("modSample_EntryPoint",
        "m_node_files/modSample.mlf") {
            inBuf_private inBuf_public
            outBuf_private outBuf_public
            .
            .
            .
        }
```

In the above example, the port "inBuf_public" is specified to include 512 words of memory. The port "outBuf_public" is specified to include 256 words of memory, comprised of 4 separate buffers, each having 64 words. Additionally, the port "outBuf_public" is specified to be capable of handling a sustained data rate of at least 2046 kilobits of data per second. Any appropriate word size can be used depending upon the particular implementation (e.g., 8-bits, 16-bits, 32-bits, etc.). Additionally, port requirements need not be specified in terms of words. For example, port requirements could be specified in terms of bits, fixed-size blocks of words, etc. Similarly, a particular representation of a specified data rate is not required. In the following example, three ports are defined, each specifying an equivalent minimum data rate using different representations:

```
        oneBuf_public 256, 64, 4, 2097152
        twoBuf_public 256, 64, 4, 2048K
        threeBuf_public 256, 64, 4, 2M
        .
        .
        .
```

F. Module Loading

As described above, in some embodiments, a task definition can specify requirements for loading the task. A source code example is provided below that specifies loading requirements for a plurality of modules that comprise a task. In a specific embodiment, the tasks are to be loaded on a device that includes a group of processing nodes referred to as "ACM." Additionally, within the "ACM" processing nodes are organized into groups of four nodes, referred to as "quads." In the example below, loading requirements of 5 different modules ("modSample1," "modSample2," "modSample3," "modSample4," "modSample5") are specified:

```
        ACM( ) {
            modSample1
            Quad( ) {
                modSample2
                Node( ) {
                    modSample3
                    modSample4
                }
                Node( ) {
                    modSample5
                }
            }
        }
        .
        .
        .
```

In the above example, because modules "modSample1," "modSample2," "modSample3," "modSample4," and "modSample5" are included within the "ACM" brackets, these modules should be loaded onto the ACM group of processing nodes. Additionally, because module "modSample1" is not included within "Quad" or "Node" keyword brackets, then this module can be loaded on any "Quad" or "Node" in the "ACM" group, and without regard to any of the other modules.

Modules "modSample2," "modSample3," "modSample4" and "modSample5" are included within brackets of a "Quad" keyword. This specifies that "modSample2," "modSample3," "modSample4," and "modSample5" should be loaded on the same "Quad." Module "modSample2" is not included within "Node" keyword brackets. This specifies that this module can be loaded on any "Node" in the "Quad," and without regard to any of the other modules. Modules "modSample3" and "modSample4" are included within one set of "Node" keyword brackets, and module "modSample5" is included within another set of "Node" keyword brackets. This specifies that modules "modSample3" and "modSample4" should be loaded on the same processing node, and that module "modSample5" should be loaded on a different processing node than that of modules "modSample3" and "modSample4."

G. Example of a Task Definition

An example of a task definition is provided below. This example includes three sections: a "Port Aliases" section, a "Module Definition" section, and a "Module Loading" section:

```
//--------------------------------------------------------------------
// Section 1 - Port Aliases
inHostFifo       0x040
scatterBuf0      0x100
scatterBuf1      0x100
scatterBuf2      0x100
gatherBuf0       0x100
gatherBuf1       0x100
gatherBuf2       0x100
outHostFifo      0x400
tag0             0
tag1             0
tag2             0
ctlBuf           0
//--------------------------------------------------------------------
// Section 2 - Module Definitions
modInput("modInput_EntryPoint", "modGenData/modGenData.alf") {
    inBuf        inHostFifo
    outBuf       genData
    ctlBuf       SelectWhich
    resource("modGenData/modGenData.alf") {
        cpu      25
    }
}
modScatter("modScatter_EntryPoint", "modScatter/modScatter.alf",
                                 ,"modScatter/modScatter.mlf") {
    inBuf        outBuf
    outBuf0      scatterBuf0
    outBuf1      scatterBuf1
    outBuf2      scatterBuf2
    resource("modScatter/modScatter.alf") {
        cpu      25
    }
    resource("modScatter/modScatter.mlf") {
        cpu      100
    }
}
modDecompress1("modDecompress_EntryPoint",
               "modDecompress/modDecompress.mlf",
               "modDecompress/modDecompress.alf") {
    inBuf        scatterBuf0
    outBuf       gatherBuf0
    tag          tag0
    resource("modDecompress/modDecompress.mlf") {
        cpu      25
    }
    resource("modDecompress/modDecompress.alf") {
        cpu      100
    }
}
modDecompress2("modDecompress_EntryPoint",
               "modDecompress/modDecompress.mlf") {
    inBuf        scatterBuf1
    outBuf       gatherBuf1
    tag          tag1
    resource() {
        cpu      25
    }
}
modDecompress3("modDecompress_EntryPoint",
               "modDecompress/modDecompress.mlf") {
    inBuf        scatterBuf2
    outBuf       gatherBuf2
    tag          tag2
    resource() {
        cpu      25
    }
}
modGather("modGather_EntryPoint", "modGather/modScatter.alf") {
    inBuf0       gatherBuf0
    inBuf1       gatherBuf1
    inBuf2       gatherBuf2
    outBuf       outHostFifo
    resource() {
        cpu      25
    }
    overlays() {
        "EntryPoint", "modGather/overlay1.alf"
        "EntryPoint", "modGather/overlay2.alf"
    }
}
//--------------------------------------------------------------------
// Section 3 - Module Loading
ACM() {
    modInput
    Quad() {
        modGather
        modDecompress3
        Node() {
            modScatter
        }
        Node() {
            modDecompress1
        }
        Node() {
            modDecompress2
        }
    }
}
```

While the above is a full description of the specific embodiments, various modifications, alternative constructions, and equivalents may be used. Therefore, the above description and illustrations should not be taken as limiting the scope of the present invention which is defined by the appended claims.

What is claimed is:

1. An integrated circuit comprising:
processing nodes that are heterogeneous between each other and comprise processing resources that are different between each other, wherein the processing nodes comprise programmable processors;
a memory that stores corresponding task definitions for different tasks to be executed by the processing nodes, the task definitions specifying processing resources for the different tasks, wherein the different tasks comprise programs for the programmable processors and the processing resources specified by the task definitions comprise program resources for executing the programs; and
a plurality of hardware schedulers in at least a portion of the processing nodes, each of the plurality of hardware schedulers in a different processing node, the hardware schedulers assigning the different tasks to the processing nodes for execution by matching the processing resources specified in the task definitions with the processing resources of the processing nodes.

2. The integrated circuit of claim 1, wherein the integrated circuit is in a consumer electronics device.

3. The integrated circuit of claim 1, wherein the integrated circuit is in a component of a consumer electronics device.

4. The integrated circuit of claim 1, wherein the processing nodes comprise configurable hardware and the processing resources specified by the task definitions comprise configuration information for configuring the configurable hardware for the different tasks.

5. The integrated circuit of claim 1, wherein the processing nodes comprise different types of processors.

6. The integrated circuit of claim 5, wherein the different types of processors include at least two of a general purpose processor, a special purpose processor, a digital signal processor, a RISC processor, and an ASIC processor.

7. The integrated circuit of claim 1, wherein the memory stores the different tasks and the different tasks include their corresponding task definitions.

8. The integrated circuit of claim 1, wherein the different tasks and the task definitions comprise computer program code.

9. The integrated circuit of claim 1, wherein the different tasks and their corresponding task definitions are located in common files stored in the memory.

10. The integrated circuit of claim 1, wherein the processing resources specified by the task definitions comprise required processing resources.

11. The integrated circuit of claim 1, wherein the processing resources specified by the task definitions comprise desired processing resources.

12. The integrated circuit of claim 1, wherein the processing resources specified by the task definitions specify processing node requirements or preferences for the different tasks.

13. The integrated circuit of claim 1, wherein the processing resources specified by the task definitions specify port requirements or preferences for the different tasks.

14. The integrated circuit of claim 1, wherein the processing resources specified by the task definitions specify buffer requirements or preferences for the different tasks.

15. The integrated circuit of claim 1, wherein the processing resources specified by the task definitions specify memory requirements or preferences for the different tasks.

16. The integrated circuit of claim 1, wherein the processing resources specified by the task definitions specify execution latency requirements or preferences for the different tasks.

17. The integrated circuit of claim 1, wherein the processing resources specified by the task definitions specify execution time requirements or preferences for the different tasks.

18. The integrated circuit of claim 1, wherein the processing resources specified by the task definitions specify execution frequency requirements or preferences for the different tasks.

19. The integrated circuit of claim 1, wherein the processing resources specified by the task definitions specify task loading requirements or preferences for the different tasks.

20. The integrated circuit of claim 1, further comprising:
a prioritizer that provides a priority for each task to be executed by the processing nodes and wherein the scheduler further assigns tasks by giving preference to higher-priority tasks when multiple tasks are simultaneously available for execution.

21. The integrated circuit of claim 1, further comprising:
an input/output system in communication with the memory and an external device for data exchange between the memory and the external device.

22. The integrated circuit of claim 1, further comprising:
storage resources in communication with the processing nodes and the scheduler.

23. The integrated circuit of claim 1, wherein at least one of the tasks is assigned to a plurality of the processing nodes for execution.

24. A method for scheduling tasks in an integrated circuit comprised of processing nodes that are heterogeneous between each other and comprise processing resources that are different between each other, the method comprising:

storing corresponding task definitions for different tasks to be executed by the processing nodes on the integrated circuit, the task definitions specifying processing resources for the different tasks, wherein the processing nodes comprise programmable processors, the different tasks comprise programs for the programmable processors, and the processing resources specified by the task definitions comprise program resources for executing the programs; and assigning the different tasks to the processing nodes for execution on the integrated circuit from the integrated circuit comprising matching the processing resources specified in the task definitions with the processing resources of the processing nodes, wherein the different tasks are assigned by a plurality of hardware schedulers, each of the plurality of hardware schedulers in a different one of the processing nodes.

25. The method of claim 24, wherein the integrated circuit is in a consumer electronics device.

26. The method of claim 24, wherein the integrated circuit is a component of a consumer electronics device.

27. The method of claim 24, wherein the processing nodes comprise configurable hardware and the processing resources specified by the task definitions comprise configuration information for configuring the configurable hardware for the different tasks.

28. The method of claim 24, wherein the processing nodes comprise different types of processors.

29. The method of claim 28, wherein the different types of processors include at least two of a general purpose processor, a special purpose processor, a digital signal processor, a RISC processor, and an ASIC processor.

30. The method of claim 24, wherein the storing of corresponding task definitions comprises storing the different tasks wherein the different tasks include their corresponding task definitions.

31. The method of claim 24, wherein the different tasks and the task definitions comprise computer program code.

32. The method of claim 24, further comprising storing the different tasks and their corresponding task definitions in common files.

33. The method of claim 24, wherein the processing resources specified by the task definitions comprise required processing resources.

34. The method of claim 24, wherein the processing resources specified by the task definitions comprise desired processing resources.

35. The method of claim 24, wherein the processing resources specified by the task definitions specify processing node requirements or preferences for the different tasks.

36. The method of claim 24, wherein the processing resources specified by the task definitions specify port requirements or preferences for the different tasks.

37. The method of claim 24, wherein the processing resources specified by the task definitions specify buffer requirements or preferences for the different tasks.

38. The method of claim 24, wherein the processing resources specified by the task definitions specify memory requirements or preferences for the different tasks.

39. The method of claim 24, wherein the processing resources specified by the task definitions specify execution latency requirements or preferences for the different tasks.

40. The method of claim 24, wherein the processing resources specified by the task definitions specify execution time requirements or preferences for the different tasks.

41. The method of claim 24, wherein the processing resources specified by the task definitions specify execution frequency requirements or preferences for the different tasks.

42. The method of claim 24, wherein the processing resources specified by the task definitions specify task loading requirements or preferences for the different tasks.

43. The method of claim 24, wherein at least one of the tasks is assigned to a plurality of the processing nodes for execution.

44. An integrated circuit comprising:

processing nodes that are heterogeneous between each other and comprise processing resources that are different between each other, wherein the processing nodes comprise programmable processors, and wherein the processing nodes comprise configurable hardware;

a memory that stores corresponding task definitions for different tasks to be executed by the processing nodes, the task definitions specifying processing resources for the different tasks, wherein the different tasks comprise programs for the programmable processors and the processing resources specified by the task definitions comprise program resources for executing the programs, and wherein the processing resources specified by the task definitions comprise configuration information for configuring the configurable hardware for the different tasks; and a plurality of hardware schedulers in at least a portion of the processing nodes, each of the plurality of hardware schedulers in a different processing node, the hardware schedulers assigning the different tasks to the processing nodes for execution by matching the processing resources specified in the task definitions with the processing resources of the processing nodes.

* * * * *